April 26, 1960 H. C. SIBLEY 2,934,678

ELECTRONIC SHIFT REGISTER

Original Filed Aug. 17, 1954 8 Sheets-Sheet 1

INVENTOR.
H. C. SIBLEY
BY Forest B. Hitchcock
HIS ATTORNEY

April 26, 1960 H. C. SIBLEY 2,934,678

ELECTRONIC SHIFT REGISTER

Original Filed Aug. 17, 1954 8 Sheets-Sheet 2

INVENTOR.
H. C. SIBLEY
BY *Forest B. Hitchcock*
HIS ATTORNEY

April 26, 1960 H. C. SIBLEY 2,934,678

ELECTRONIC SHIFT REGISTER

Original Filed Aug. 17, 1954 8 Sheets-Sheet 3

*INVENTOR.*

H. C. SIBLEY

*BY* Forest B. Hitchcock

HIS ATTORNEY

April 26, 1960 H. C. SIBLEY 2,934,678

ELECTRONIC SHIFT REGISTER

Original Filed Aug. 17, 1954 8 Sheets-Sheet 4

*INVENTOR.*

H. C. SIBLEY

*BY* Forest B. Hitchcock

HIS ATTORNEY

GROUP A CONTROL EXECUTION RELAY 121

GROUP B CONTROL EXECUTION RELAY 131

INVENTOR.
H. C. SIBLEY
BY Forest B. Hitchcock
HIS ATTORNEY

INVENTOR.
H. C. SIBLEY
BY Forest B. Hitchcock
HIS ATTORNEY

ELECTRONIC SHIFT REGISTER

Original Filed Aug. 17, 1954 8 Sheets-Sheet 7

INVENTOR.
H. C. SIBLEY
BY Forest B. Hitchcock
HIS ATTORNEY

ELECTRONIC SHIFT REGISTER

Original Filed Aug. 17, 1954 8 Sheets-Sheet 8

SHIFT REGISTER STAGES

INVENTOR.
H. C. SIBLEY
BY Forest B. Hitchcock
HIS ATTORNEY 2,934,678
Patented Apr. 26, 1960

2,934,678

ELECTRONIC SHIFT REGISTER

Henry C. Sibley, Spencerport, N.Y., assignor to General Railway Signal Company, Rochester, N.Y.

Original application August 17, 1954, Serial No. 450,303, now Patent No. 2,874,368, dated February 17, 1959. Divided and this application November 4, 1958, Serial No. 771,794

4 Claims. (Cl. 315—84.5)

This invention relates to shift registers, and it more particularly pertains to an electronic shift register employing gas tubes.

The present invention is a division of my copending application Ser. No. 450,303, filed August 17, 1954, now U.S. Patent 2,874,368, issued February 17, 1959, and no claim is intended to be made herein to the subject matter claimed in such prior application.

An electronic shift register of the type provided by the present invention may have utility in a number of different types of systems, such, for example, as in the code communication system disclosed in my above mentioned prior application Ser. No. 450,303, filed August 17, 1954 now U.S. Patent 2,874,368 issued February 17, 1959 which is assumed to be provided for use in centralized traffic control systems for railroads. In such a system, the controls for the various field stations are transmitted successively and repetitively. In other words, in one control cycle all of the controls for all of the stations are transmitted, and this cycle is then followed by an identical cycle, and so on. Concurrently with the transmission of the controls, all indications from all the field stations are transmitted in succession back to the control office. Because of the high speed of such a system, the transfer of controls and indications is so rapid that it is virtually impossible for any backlog of information to accumulate. There is also no need to establish code superiority among the different field stations because each station can transmit its indications only during its allotted part of the cycle. Also, since the code relating to a particular field station is identifiable with that station simply by its position in either a control or indication cycle, substantially the entire cycle may be used for the transmission of controls and indications, respectively.

One objection in the past to the use of electronic systems, however, has been their complexity and their rather severe power requirements. The various field stations of a system of this kind may frequently be at remote locations where commercial power sources are not available or are not sufficiently reliable to be used as the sole source of power. It is, therefore, necessary that the field station apparatus be so organized that it can be operated from a battery source of power without imposing an unduly severe load upon such a battery. Accordingly, the circuit organization of the present invention has been so constructed that the power requirements for the system and particularly at the field stations have been reduced to a practicable low value. This highly desirable feature has been accomplished in part through the use of various circuit organizations using cold cathode glow discharge tubes. These tubes, by not requiring any filament heating power, considerably reduce the power requirements for the system apparatus.

Described briefly, and without any attempt to define the invention in its exact terms, the electronic code communication system here disclosed is of the kind known as a repeat scanning type of system. Two channels of communication are provided between the control office and the various field stations. The controls desired to be effective on the apparatus at the different field stations are constantly transmitted over one of these channels of communication and the indications are transmitted on the other channel concurrently with the controls.

The transmitted information (controls or indications) comprises a distinctive code having time-spaced distinctive characters. In the present embodiment of the invention the two different channels of communication comprise two different carrier frequencies which are transmitted over a single pair of line wires. Other means of transmission such as by space radio may equally well be used.

The distinctive characters making up the indication code may for convenience be termed "marks" and "spaces". For a space character, no carrier is transmitted: for a mark character, the carrier frequency is transmitted for the first portion only of the pulse period allotted to the digit; no carrier is transmitted on the second portion so that when successive marks are transmitted there will be gaps between successive transmissions of carrier to facilitate the recognition of the marks as separate characters.

The distinctive characters making up the control code cycle include these same marks and spaces and also include station-call and synchronizing marks. These latter two code characters are alike and are similar to the mark character just described with the exception that their duration is twice as great.

The control code cycle always originates with a synchronizing pulse. Following the synchronizing pulse comes the station-call pulse for the first field station and then a group of code digits (marks and spaces) that comprises the control for the devices at the first station. Upon the conclusion of the control code for the first station another station-call pulse appears in the control code. This is then followed by another group of marks and spaces representing the control code for the second field station. The controls for all the various field stations are thus transmitted sequentially so as to make up a complete control code cycle. At the end of this cycle another synchronizing pulse is transmitted to initiate a second control cycle similar to the first, and this occurs continuously all the time that the system is in operation.

During a control code cycle, the station-call pulses occur only at fairly long intervals since successive station-call pulses are always separated by the control code for a particular field station. At the beginning of each controle code cycle, however, the synchronizing pulse occurs and is followed immediately thereafter by a station-call pulse for the first field station. The occurrence of these two long code characters in succession is detected at each field station and results in each field station being brought into synchronism with the transmitting control office at the beginning of each new cycle in the event that any field station has, since the beginning of the previous cycle, for any reason gotten out of synchronism with the control office.

At each field station, the station-call pulses are recognized as such and applied to a station stepper. This station stepper counts the successive station-call pulses and causes the field station to become responsive to the received control code only when the number of received station-call pulses corresponds to the number of that field station as related to its position in the control cycle. The decoding means at the field station is thus made active so that the required information can be extracted from the code for that station and made effective to control the various devices at that station. Upon the reception of the next station-call pulse for the following field station, the decoding circuits are once again rendered inactive. During the interval that the field station apparatus is gated to be responsive to its control code, its indication coding and transmitting means are also made effective so that the indication code may be transmitted back to the control office concurrently with the reception of the control code.

At the control office, various gating circuits selectively condition the indication receiving means so that the successively received indication codes will be routed to the proper indication storage apparatus. For example, at the time that the first field station is being transmitted to, the gating circuits at the control office condition the indication storage circuits associated with the first field station so that the indication code received back from the first field station at this time is routed to the indication storage apparatus that is direcly associated with this first station. In the same way, at the time that the control code for station 2 is being transmitted, the gating circuits at the control office cause any indication code received during this time to be routed to the proper indication storage means provided for this second station.

With a code organization as described in which one kind of character is represented by the absence of any transmitted signal, it is necessary that there be some means provided at each field station to demarcate the various pulse periods of a received control code so that it can be determined whether or not carrier is or is not received on any such pulse period. It can thus be determined whether or not any received character is a mark or a space or a station-call or synchronizing mark. This is accomplished by providing an oscillator at each field station which is constructed to operate at the same frequency as a corresponding oscillator at the control office. The control office oscillator establishes the repetition rate for the entire system and is constructed in the present embodiment of the invention to operate at a frequency of 200 cycles per second. This establishes that the duration of each mark or space period is of five milliseconds duration. The similar oscillator at each field station causes the station period for that station to be broken up into similar five millisecond pulse periods. The reception of carrier at the field station during a pulse period is an indication that that character is a mark pulse; when no carrier is received during any five millisecond pulse period that character is recognized as a space.

The code communication system of this invention is particularly adapted for the transfer of a large number of controls and indications between the control office and each of a plurality of field stations. Ordinarily, when a large number of controls is desired to be transmitted to any field station or a large number of indications is desired to be received from a field station, the complexity of the decoding apparatus at the field station is increased correspondingly. In the present system, however, this is avoided by communicating with each field station twice in a complete cycle of operation. The controls and indications relating to a particular field station are transmitted in two different groups. Only part of the controls for a particular station are transmitted to that station the first time; the remainder of the controls are transmitted in the second half of the cycle. In a similar manner, substantially half of the indications are transmitted in one group, and the remaining indications are transmitted in the second group.

As an illustration, during the station period following the transmission of the second station-call pulse of a cycle, a series of control code characters is transmitted which represents half of the controls for the second field station. This transmission of controls to the second station terminates with the transmission of the third station-call pulse. In addition to transmitting substantially half of the controls to the second field station during this interval, half of the indications from the second field station are received at the control office. After this, controls are transmitted to the remaining field stations in sequence but in each case only half of the controls are transmitted and half of the indications from the respective field station are received. While communication is thus being had with the other field stations, the previously received controls at the second field station are executed (i.e. made effective to control the proper devices) and following this they are, in effect, erased from the field station apparatus.

At a later time in the cycle, the second group of controls is transmitted from the control office to the second station. The station stepper causes the decoding circuits to again become responsive to the received control code during the station period extending from the seventh to the eighth station-call pulse so that this second group of controls will be properly registered in the decoding circuits for this field station. Also, during this station period, the second half of the indications from the second field station are transmitted to the control office. Following this, field station Nos. 3 and 4 and all other stations receive their second group of controls. In the meantime, the second group of controls registered in the decoding apparatus of the second field station is executed and the registered controls once again erased from the system so that, when the first group of controls for this station is again received in the next cycle of operation, the control registering means is properly cleared out and can respond to the newly received controls.

By thus transmitting a large number of controls and indications in separate groups rather than all at one time, it is possible to simplify greatly the code storage and handling means at each field station. The code handling capacity required is, in effect, approximately halved with a resulting substantial decrease in the number of tubes required and also in the amount of power required to operate the system.

The station stepper provided at each field station comprises a multicathode, cold cathode glow tube. This tube is of the kind having a single anode and a plurality of cathodes arranged in a circular pattern about the anode. The input counts to the tube are applied to transfer electrodes. When the appropriate plate-cathode voltage is applied to the tube, a glow develops between the anode and one of the cathodes. Applying an input count to the transfer electrodes causes this glow to transfer to an adjacent cathode. Thus, if an input pulse is applied to the transfer electrodes for each received station-call pulse, the glow transfers from cathode to cathode and the particular cathode which is glowing at any time provides a means for determining how many station-call pulses have been received since the initial synchronizing pulse.

More specifically, the number of cathodes for the station stepper multicathode tubes preferably equals the number of station periods occurring in a complete cycle of operation. Synchronization of each field station with the transmitting control office takes place at the beginning of each cycle. As a result of this synchronization, the station stepper tube at each field station causes the glow to be on the appropriate cathode for that station at the beginning of each cycle. Consequently, the location of the glow at any subsequent time in the cycle readily determines how many station-call pulses have been received since the beginning of the cycle and thus provides a means for determining which field station should have its decoding circuits at that instant responsive to the received control code.

A shift register is included in the apparatus at each field station and is used both for the registering of received control codes and for registering indication codes prior to their being transmitted to the control office. Just prior to the time that any field station is to receive a control code, the various stages of the shift register are conditioned to what may be termed their "0" or "1" conditions in accordance with whether a mark or a space character is to be transmitted in the corresponding pulse period of the indication code. As the control code is received, an input pulse is applied to the input of the shift register for each occurrence of a mark character in the control code. Between successive characters of the code, whether marks or spaces, shift pulses are applied also to the shift register. These shift pulses have the effect, not only of stepping the received control code into the shift register, but of causing the indication code previously stored in the shift register to appear as time-spaced pulses at the output of the shift register. The exact manner in which this occurs will later be described when a detailed consideration of these circuits is undertaken. The effect, however, is that the single shift register at each field station is concurrently used for both indications and controls with the indications appearing on the output lead of the shift register at the same time that the received control code is applied to the input lead of the shift register.

A feature of this invention is the use of a shift register comprising cold cathode, grid glow tubes. Obviously, an important advantage resulting from the use of cold cathode tubes in a shift register is elimination for any need of supplying filament power. The shift register of this invention has the added advantage that the stages are so interconnected that the transfer of the condition of one stage to the next is greatly facilitated. In shift registers of the prior art, it has been common practice to provide delay circuit means between the successive stages for reasons which will later be more apparent. The use of such delay circuit means introduces added complexity, particularly so in a shift register adapted to operate at a relatively slow rate, as in the system of this invention where the repetition rate of the system is based on a frequency of 200 cycles per second.

An object of the present invention is to provide an improved shift register to provide reliable and fast operation.

Another object of this invention is to provide a shift register for an electronic code communication system which is adapted so as to accommodate simultaneously the transmission of indications and the reception of controls.

Other objects, purposes, and characteristic features of this invention will in part be obvious from the accompanying drawings and in part pointed out as the description of the invention progresses.

In describing this invention in detail, reference will be made to the accompanying drawings in which those parts having similar features and functions are designated throughout the several views by like reference characters, and in which.

Figure 3A:
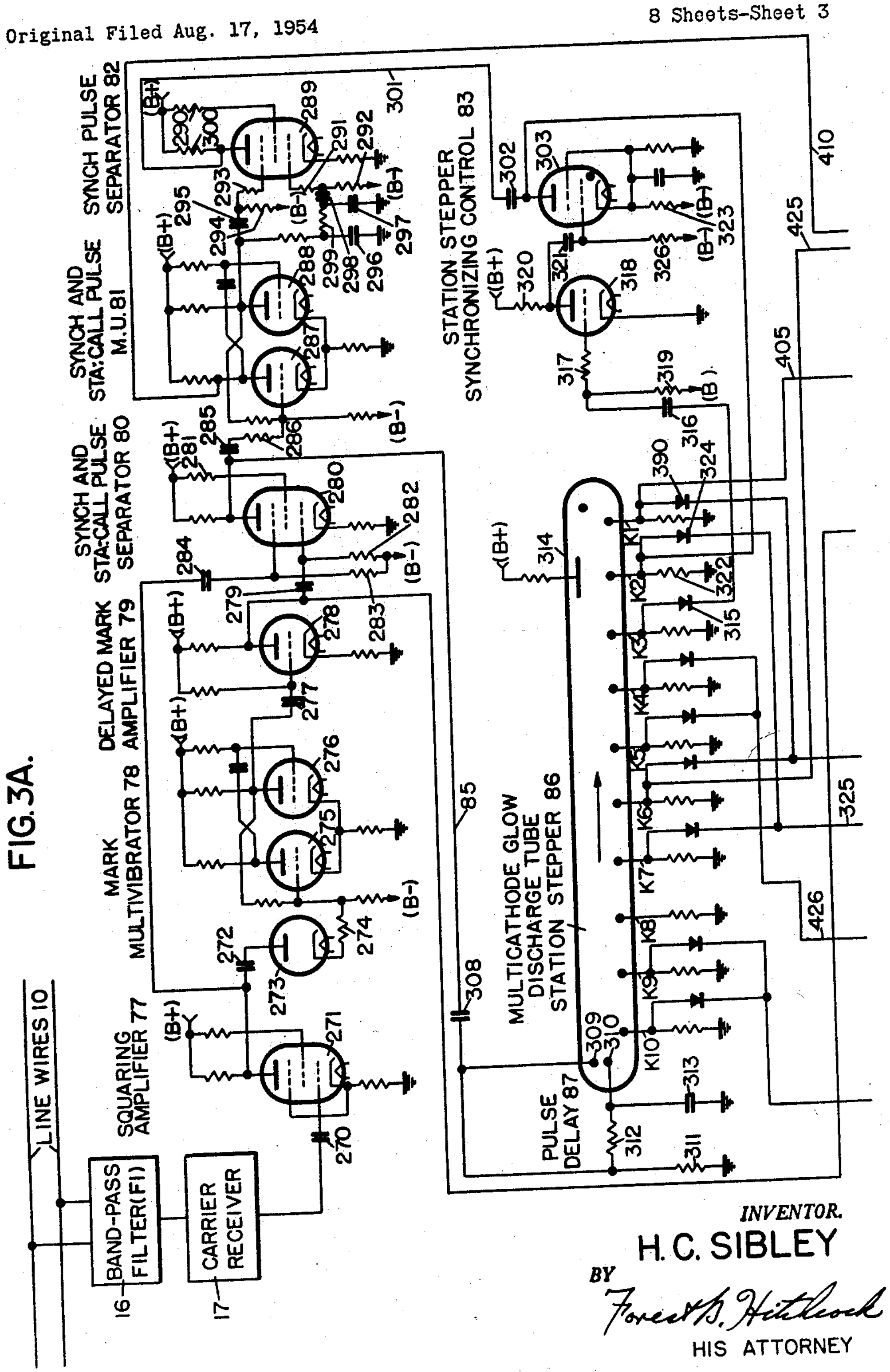
Figure 3B:
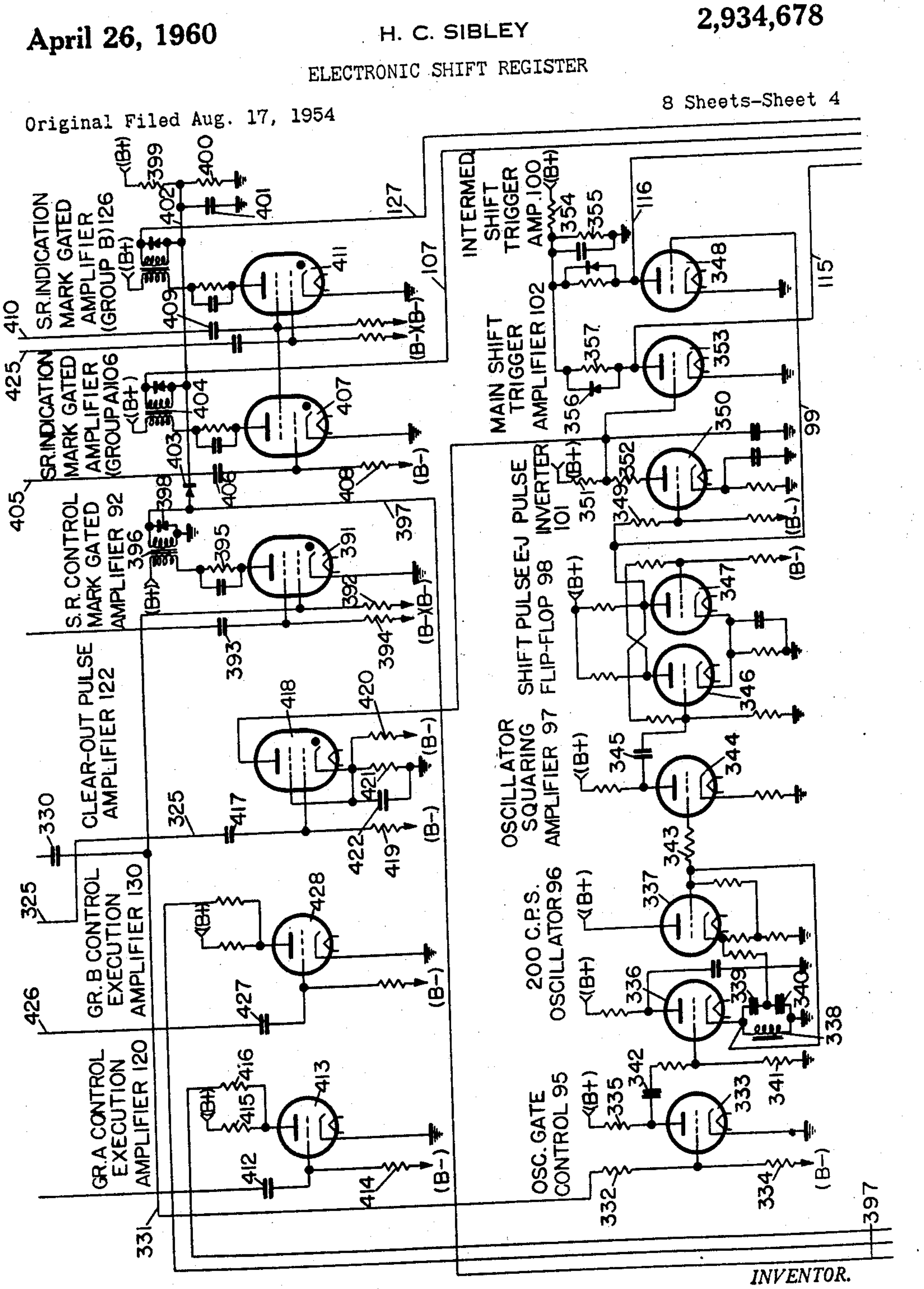
Figure 3C:
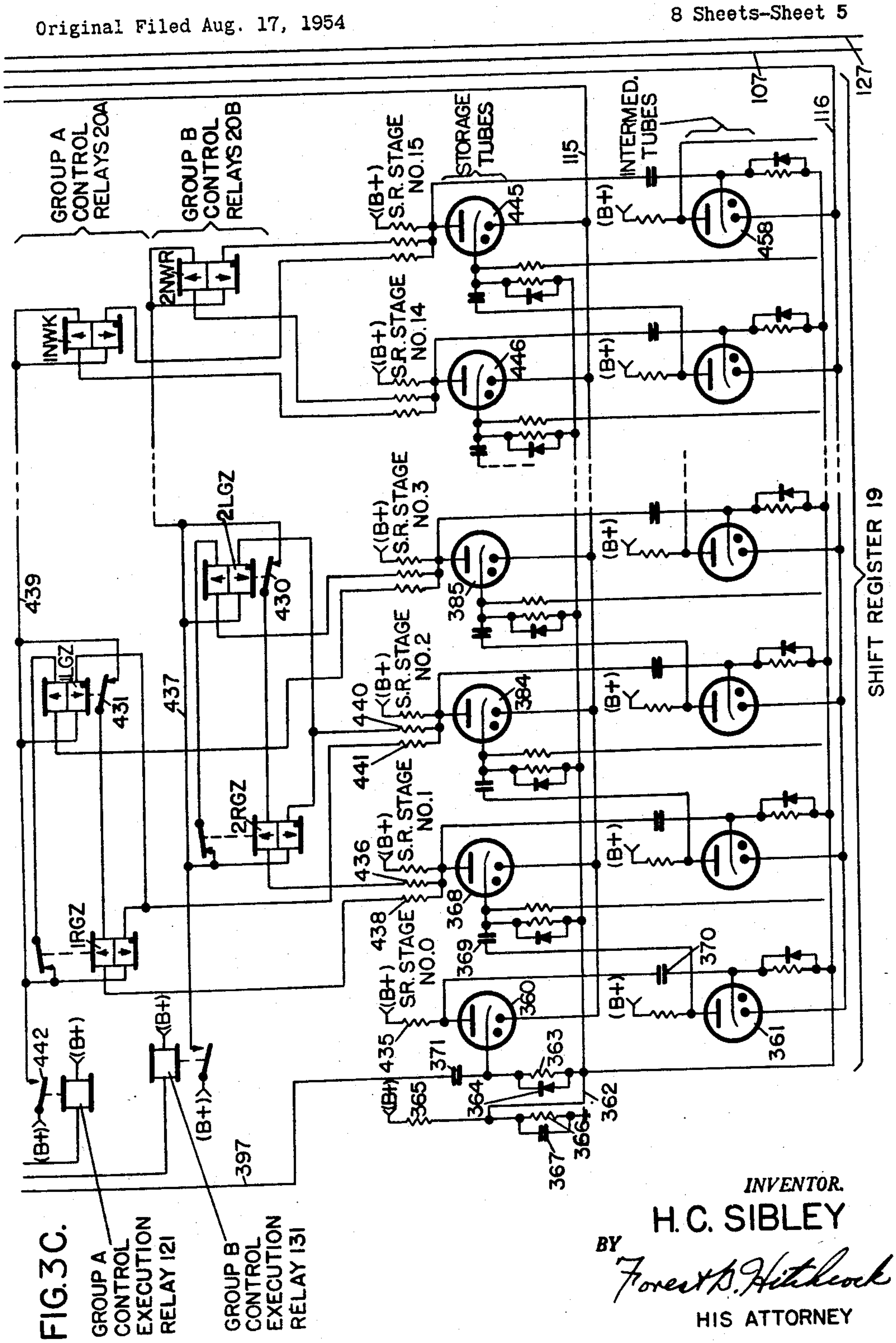
Figure 3D:
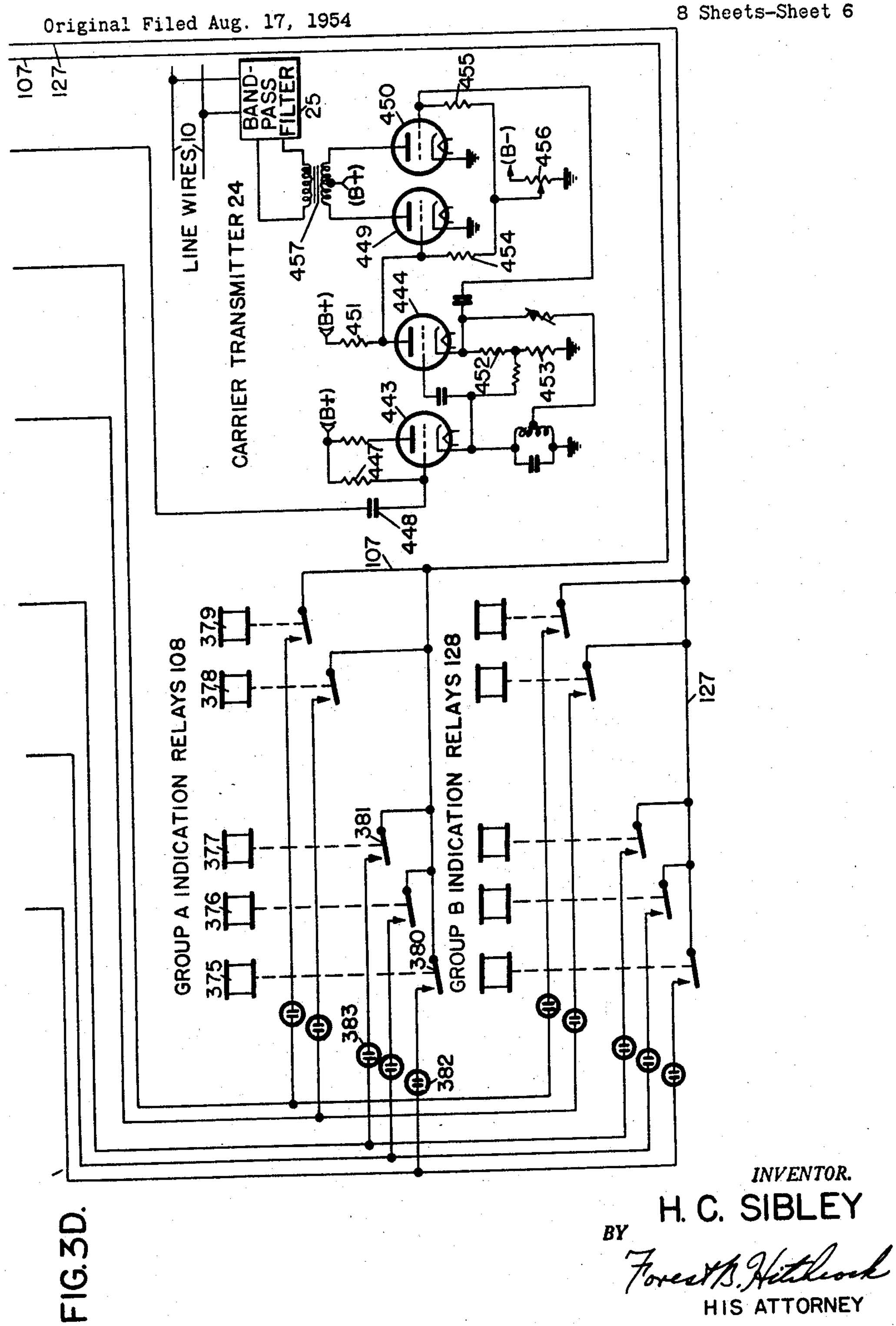
Figure 4A:
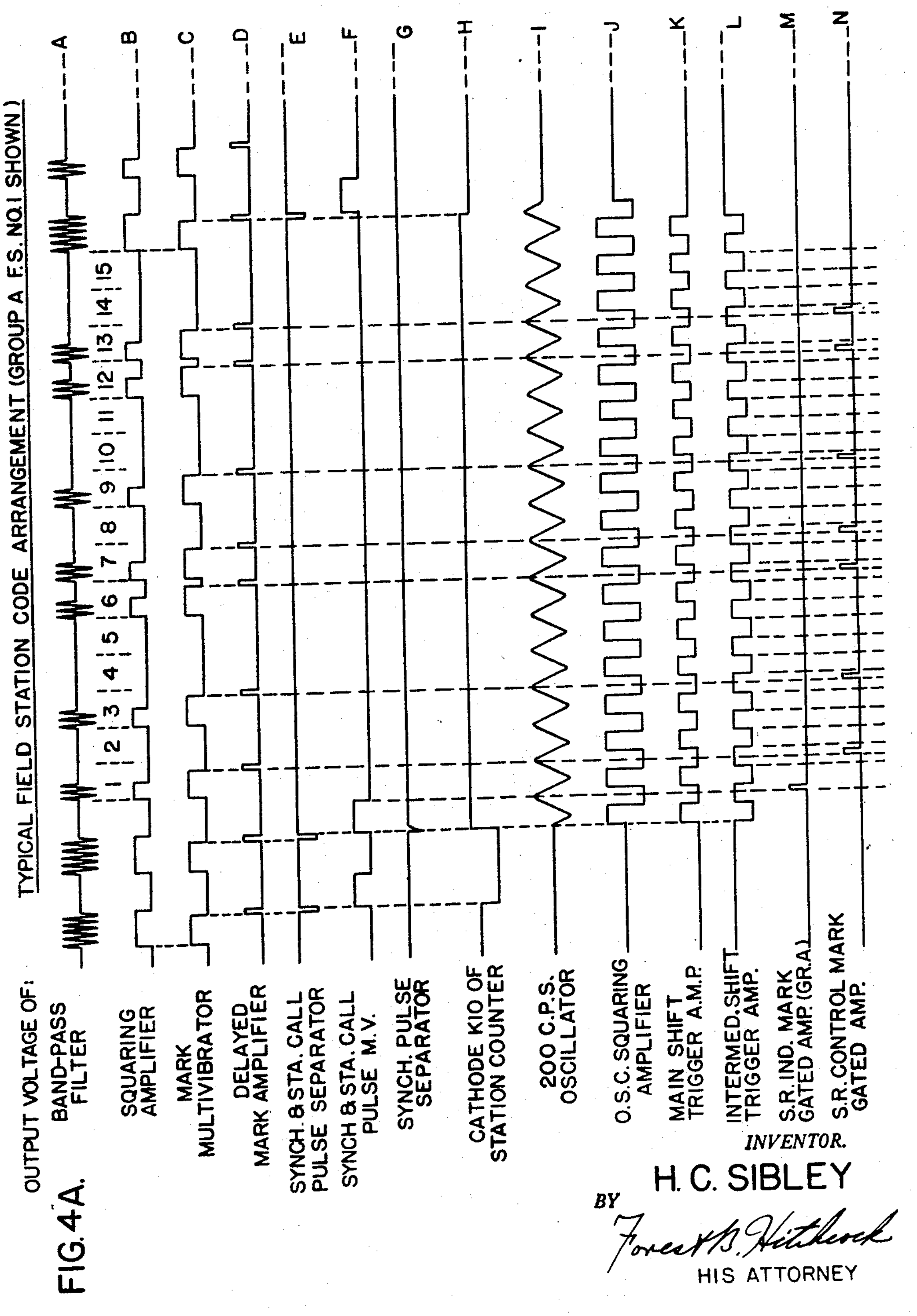
Figure 4B:
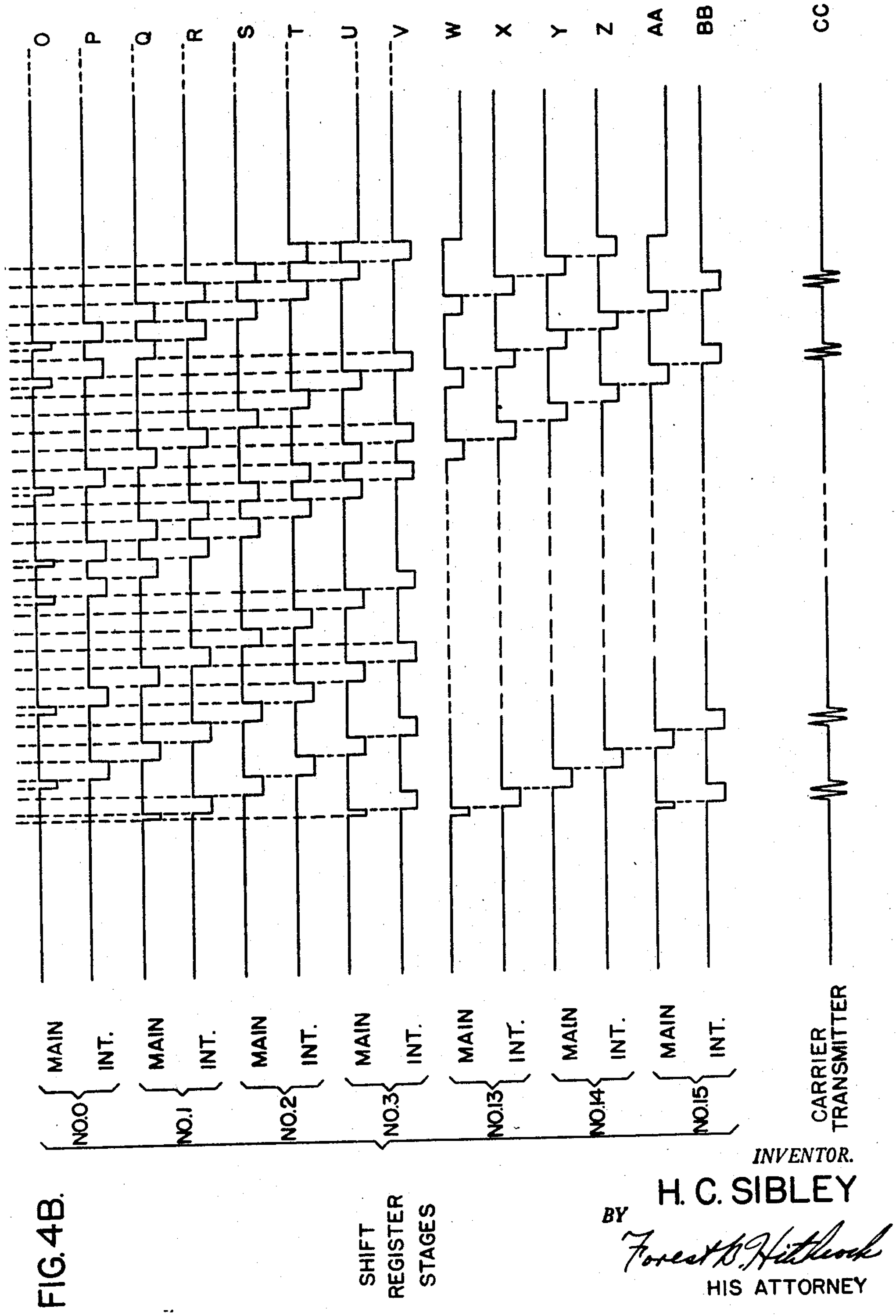

Figs. 3A, 3B, 3C and 3D, placed one above the other, illustrate the detailed circuit organization of a typical field station; and Figs. 4A and 4B, placed one above the other, constitute a waveform diagram relating to the operation of the field station apparatus.

To simplify the illustrations and facilitate the explanation of this invention, the various parts and circuits have been shown diagrammatically, and certain conventional illustrations are employed. The drawings have been made to make it easy to understand the principles and manner of operation of this invention rather than to illustrate the specific construction and arrangement of parts that would be used in practice. The various tubes and their elements and all other circuit components have been shown in conventional form. The various relays and their contacts have also been illustrated conventionally instead of showing all of their details. Sources of electrical energy have been represented also by conventional symbols. Thus, the symbols (B+) and (B−) represent the positive and negative terminals respectively of a source of energy of sufficient voltage to make it suitable for the control of electron tubes and their associated apparatus. The symbol for a ground connection represents the connection to a voltage level between the (B+) and (B−) voltage levels. The symbols (+) and (−) associated with appropriate arrowheads and tails respectively represent the positive and negative terminals of a source of energy of relatively low voltage such as is suitable for the control of electromagnetic relays and the like.

Figure 1:
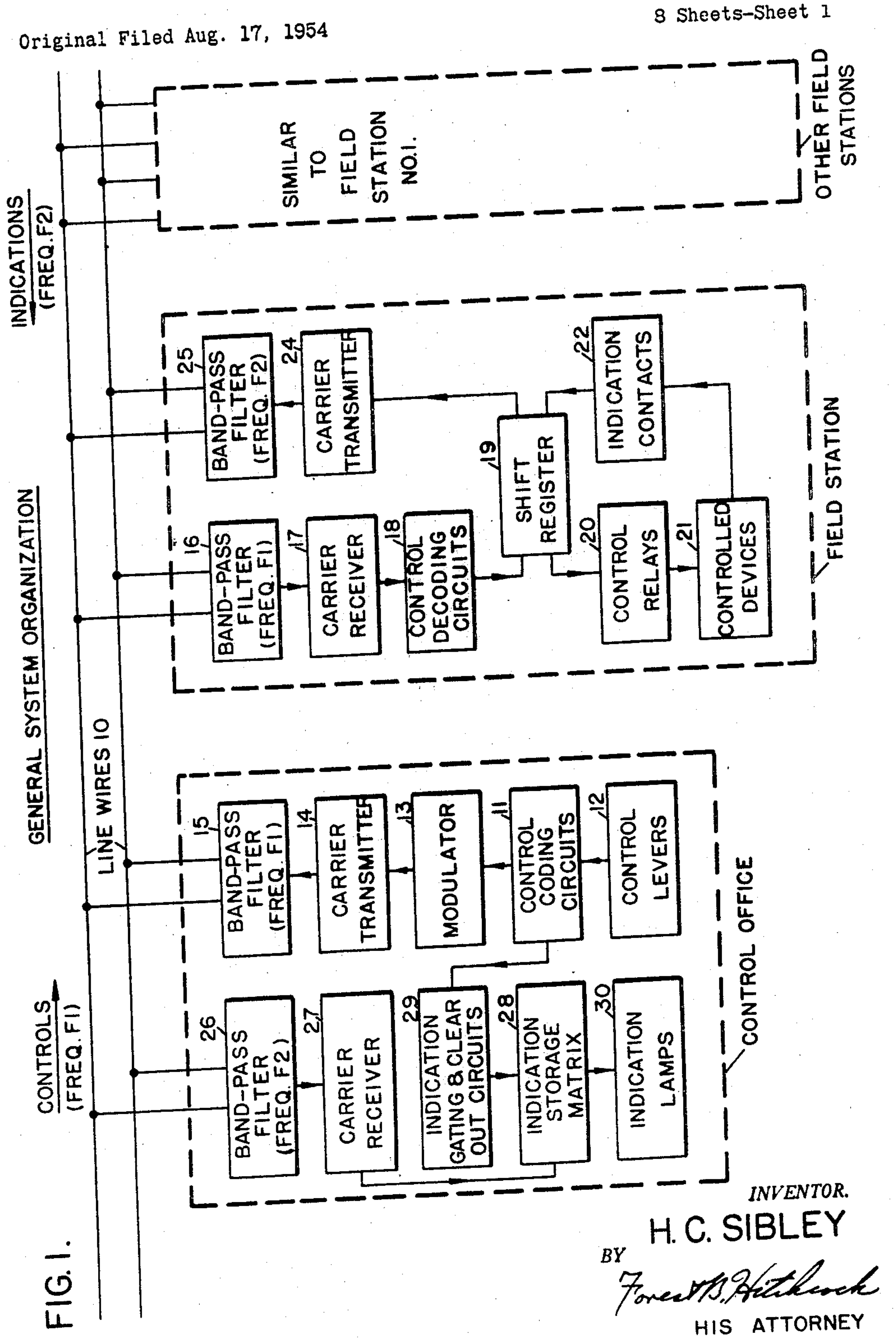
Fig. 1 is a simplified block diagram illustrating the general organization of the system of the present invention.

The general system organization of a system employing the present invention is disclosed in block diagram in Fig. 1. This drawing shows a pair of line wires 10 which extend between a control office and a plurality of field stations. Since all of the field stations are similar, only one typical field station has been shown in block form in this diagram.

All the field stations and the control office transmit and receive over the single pair of line wires 10. The controls are transmitted over the line wires as a coded carrier frequency F1; whereas, the indications are transmitted from each of the field stations to the control office over a different carrier frequency F2. Because both carrier receivers and transmitters are by themselves not sufficiently frequency selective, a band-pass filter is interposed between the line wires and each carrier receiver and also between the output of each carrier transmitter and the line wires 10.

The control office apparatus includes control coding circuits 11 which are governed by the control levers 12. Briefly, the control coding circuits 11 include means for demarcating the successive cycles of operation and for making up the code constituting each complete cycle. The particular permutation of mark and space characters making up the code group for a particular station is governed by the position of the control levers 12.

The output of the control coding circuits 11 comprises a time spaced series of code digits including the synchronizing mark, the various station-call marks, and the mark and space characters constituting the codes for the various field stations. This output is applied to a modulator 13 which controls the output of the carrier transmitter 14. Thus, for each space character in the code, the modulator 13 prevents the carrier transmitter 14 from supplying its distinctive carrier frequency F1 through the band-pass filter 15 to line wires 10. For all the other kinds of characters included in a control code cycle, the modulator 13 causes the carrier transmitter to emit short pulses of carrier frequency for predetermined lengths of time as will later be described, and these pulses of carrier frequency F1 are then applied through the band-pass filter 15 to line wires 10.

At each field station, the received control code of frequency F1 is applied through a band-pass filter 16 to a carrier receiver 17. The code output of receiver 17 is then applied to the control decoding circuits 18. The control decoding circuits 18 include station counting means which renders each station responsive only to that portion of the control code cycle intended for it. As a result, there is applied from the output of the control decoding circuits on selected station periods a distinctive series of pulses corresponding to the control code for that particular station. These are applied to the shift register with the result that, when the entire control code for the station has been received, the various stages of the shift register are successively conditioned in accordance with the pattern of marks and spaces that are intended for this station. The stages of the shift register are then effective to selectively energize a plurality of control relays 20 and these through their contacts are then able to control the various controlled devices 21.

Prior to the reception of a control code at any particular station, the controlled devices are effective through the indication contacts 22 to selectively condition the various stages of the shift register 19. The shift register stages assume a particular permutation of what may be designated their "0" and "1" conditions in accordance with the indication code desired to be transmitted to the control office. Accordingly, when the control decoding circuits 18 are effective to step the received control code into the shift register 19, the indication code previously stored in the shift register is, in effect, stepped out of the last stage of the shift register. Thus, the shift register may be used to directly control the transmitter 24 with the result that pulses of carrier frequency F2 are applied through the band-pass filter 25 to line wires 10 in a preselected combination of marks and spaces making up the desired indication information to be transferred to the control office.

At the control office, the received indication code is applied through the band-pass filter 26 to the carrier receiver 27. As a result, a series of time-spaced pulses whose pattern corresponds to the received indication code is applied to the indication storage matrix 28. The control coding circuits 11 are effective through the indication gating and clear-out circuits 29 to provide the required gating functions with respect to the indication storage matrix 28. This means, in effect, that the received indication code is routed to the proper indication storage circuits relating to the particular field station from which the indication code originated. These indication gating and clear-out circuits 29 also are effective to erase the indications for a particular field station just prior to the reception of a new indication code from that station. In this way, the indications displayed continually represent the latest information received from the field stations.

Figure 2:
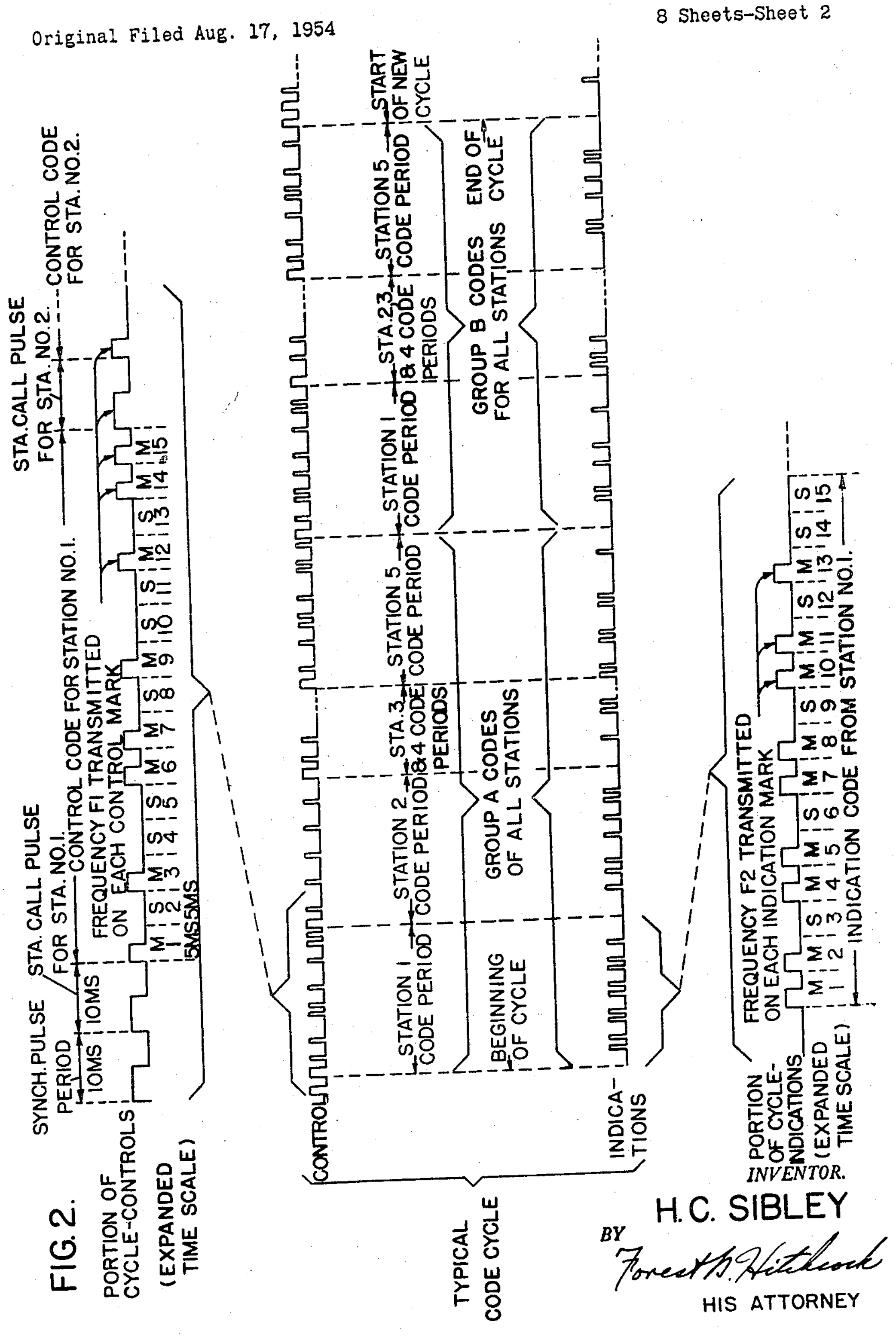
Fig. 2 is a simplified timing chart showing the general code organization of the present invention.

The general code organization of the present invention is illustrated in Fig. 2. It is shown in this drawing that each cycle of operation begins with a series of two pulses whose duration is greater than that of the normal mark characters making up either the control or indication code of a particular field station. The first of these long code characters is the synchronizing pulse, and the second is the station-call pulse for station No. 1. Following the station-call pulse for the first field station is a series of time spaced pulses of carrier frequency which by their permutation of positions in the interval between the first and second station-call pulses provide distinctive control information for the first field station. Following this code for the first field station, the control code includes another station-call pulse and then a series of marks and spaces which provide the information for the control of the devices at the second field station. In a similar way, the control code cycle includes controls for all of the field stations in the system.

In the present embodiment of the invention, it is assumed that five field stations are provided but that each field station receives a group of controls twice within a single cycle of operation so that a greater number of controls and indications may be accommodated at each field station without corresponding increase in complexity of equipment as has already been noted. Thus, after each of the five field stations has received its group A control codes, each station is transmitted to in turn once more so as to receive its group B codes. Upon the conclusion of the second station period for station No. 5, the cycle is completed and a new cycle is again immediately started with another synchronizing pulse.

During the time that the controls are being transmitted to field station No. 1, an indication code is being received from this same field station. In a similar manner, throughout the whole cycle, indication codes are received from the field stations as they respectively receive their control codes. Two separate groups of controls are transmitted to each field station in the system in a complete cycle and concurrently two groups of indications are received from each field station.

A portion of the control code cycle is shown with an expanded time scale at the top of Fig. 2. This makes it clear that the distinctive carrier frequency F1 used for controls is transmitted only during the first half of each 10 millisecond synch pulse period to thereby make up the distinctive synchronizing pulse. The station-call pulse which follows the synch pulse is identical to the synch pulse. On each of the fifteen 5 millisecond pulse periods occurring between the station-call pulse for station No. 1 and the station-call pulse for station No. 2, a mark or space character is represented in the drawing. Thus, a mark, designated by the letter M, is shown as being transmitted for the first pulse period and a space designated by the letter S for the second pulse period. For the mark character, it is shown that the carrier frequency F1 is transmitted for only substantially the first half of the pulse period. For the space character, no carrier is transmitted.

The portion of the indication cycle shown with an expanded time scale on the bottom of the drawing indicates that fifteen pulse periods are also provided for the transmission of indications from any field station. On any pulse period, either a mark or space character may be sent. These mark and space characters are exactly like those in the control cycle except that they are transmitted instead on frequency F2. This drawing indicates also that the indication code includes no synchronizing or station-call pulses. The reason for this is that the gating functions are provided at the control office, and since the indication code from any field station is received during the same station period during which controls are transmitted to that station, the control office gating circuits may be directly utilized for routing received indication codes to the appropriate indication storage circuits.

The interrupted carrier frequency F1 that constitutes the control code cycle transmitted from the control office is supplied from the line wire 10, through band-pass filter 16, to carrier receiver 17 (see Fig. 3A). The output of the carrier receiver 17 is applied to the carrier squaring amplifier 77. This squaring amplifier 77 provides an output of rectangularly shaped voltage pulses whose duration corresponds to the length of the carrier pulse received. Thus, in response to a typical input of carrier signal as illustrated at line A of Fig. 4A, the squaring amplifier 77 provides an output of positive-going rectangularly shaped pulses as shown on line B of this figure.

These positive-going pulses are applied to the mark multivibrator 78. This mark multivibrator comprises a two tube, dual state trigger circuit of the kind commonly known as a one-shot multivibrator. The mark multivibrator 78 responds to the positive-going leading edge of each output pulse of the carrier squaring amplifier 77 by operating from its normal condition to the opposite condition. After a predetermined time interval, the mark multivibrator abruptly restores itself to its normal condition. This time interval is selected to be greater than the 2.5 millisecond period for which carrier is applied to the line for a control mark digit appearing in the control code but less than the five millisecond interval of time that carrier is applied for either a synchronizing mark or station-call mark as shown by comparing line C with lines A and B in Fig. 4A.

Each time the mark multivibrator 78 restores to its normal condition it causes the delayed mark amplifier 79 to provide a positive-going trigger pulse that is applied to the synch and station-call pulse separator 80 (see line D, Fig. 4A). The synch and station-call pulse separator 80 thus received an input pulse of carrier that is received. Its function is to produce an output pulse only in response to each synch or station-call pulse. To accomplish this, it is provided with an additional gating voltage obtained from the carrier squaring amplifier 77; it is only when this separator 80 is being gated in this manner that it can respond to a trigger pulse from the delay mark amplifier 79 by producing a corresponding output pulse. As can be seen by comparing lines D and B of Fig. 4A, a trigger pulse from the delayed mark amplifier 79 occurs concurrently with an output pulse from the carrier squaring amplifier only at the time of either a synchronizing or station-call pulse. Consequently, it is only at such times that a negative-going pulse is supplied to the synch and station-call pulse multivibrator 81 as shown at line E of Fig. 4A.

The synch and station-call pulse multivibrator 81 is similar to the mark multivibrator 78 already described. Each negative-going pulse causes this multivibrator to operate from its normal condition on the positive-going trailing edge, and this multivibrator then restores to its normal condition only after a preselected time interval. The resulting positive-going output pulses of the synch and station-call pulse multivibrator 81 shown in Fig. 4A at line F are applied to the synch pulse separator 82.

The purpose of the synch pulse separator 82 is to provide an output at the beginning of each cycle so as to obtain proper synchronization of the field station apparatus. Essentially, this synch pulse separator is an integrating circuit and is effective to provide an output pulse as shown at line G of Fig. 4A only when it receives in quick succession two pulses from the synch and station-call pulse multivibrator 81. Such successive pulses are applied to the synch pulse separator 82 only at the beginning of each complete cycle of operation when the synchronizing pulse is immediately followed by the station-call pulse for field station No. 1. Consequently, an output pulse is applied to the station stepper synchronizing control 83 (see line G of Fig. 4A) only at the beginning of a cycle.

The negative-going trigger pulses obtained from the output of the synch and station-call pulse separator 80 are applied over wire 85 directly to the station stepper 86 and to the pulse delay 87. The pulse delay 87 causes negative-going trigger pulses to be applied to station stepper 86 over wire 88 that are very slightly delayed with respect to those applied to the station stepper directly over wire 85. Therefore, in response to each synch and each station-call pulse, the station stepper receives input pulses over both wires 85 and 88 with the pulse on wire 88 being slightly delayed with respect to the pulse on wire 85. Each such input of two pulses causes the glow of the multi-cathode station stepper tube to advance from one cathode to the next. The glow transfers one cathode at a time in the direction from cathode A10 to cathode A1. These cathodes are successively positioned in a circular pattern about the anode of the tube so that cathode K10 is actually adjacent cathode K1. Thus, an input applied to the stepper tube when the glow is on cathode K1 causes the glow to transfer to cathode K10.

At each field station, the station stepper 86 not only conditions the decoding circuits to be responsive to the particular part of the control code cycle designated for that station but also causes certain other functions to be performed at other times in the code cycle. These other functions relate to the clearing out of the shift register just prior to the reception of new controls and the execution of the controls after they are received. Thus, on the station period immediately preceding the one on which a station is to receive its controls, the station stepper 86 causes the shift register at that station to be cleared out. On the two station periods immediately following the one on which controls are to be received at any field station, the station stepper 86 provides an output causing the controls then stored in the shift register to be executed.

These various circuit functions are performed in response to outputs obtained directly from the cathodes of the station stepper 86. Thus, when the glow is on a particular cathode of the station stepper tube, the voltage at that cathode is raised with respect to all the other cathodes and this higher voltage is then effective to control an associated circuit organization to produce the desired result.

The connections from the various station stepper cathodes to the plurality of different circuit organization providing the desired functions are made the same at each of the different field stations; only the station stepper synchronizing control 83 is connected differently at each field station. Because of this, it is necessary that the station steppers at the various field stations be operated out of step with respect to each other so that the proper function will be performed at each station at the appropriate time in the cycle.

As an illustration, the station stepper at any station renders the associated decoding circuits responsive to receive group A controls and transmit group A indications when the glow of the station stepper tube is on cathode K1. At field station No. 1, therefore, the station stepper synchronizing control 83 must respond to the pulse received from the synch pulse separator 82 and cause the glow of the station stepper tube to be on cathode K1 at the very beginning of the cycle so that the associated decoding circuits will be responsive during the No. 1 station period to the control code received at such time and intended for this particular field station.

In an analogous manner, at field station No. 4 the station stepper synchronizing control 83 must cause the station stepper tube to glow at cathode K4 at the very beginning of the cycle. If this is done, the glow will be on cathode K1 during the fourth station period. With the glow on cathode K1, the decoding circuits will be responsive to the code received during this fourth station period as this is, of course, the code intended for station No. 4.

The connections between the synchronizing control 83 an dthe station stepper 86 have been shown in Fig. 3A as they are required to be for field station No. 2 in the system. The connections are thus made in such a way that wire 89 is connected to cathode K3, and wire 90 is connected to cathode K2. These connections thus ensure that the glow of the tube in the station stepper 86 will always be on cathode K2 immediately following the first station-call pulse in the cycle. The manner in which the synchronizing control effects this synchronization of the station stepper will later be described in detail when the specific circuits employed are being considered.

As previously explained, the various decoding circuits at a field station are rendered responsive to the group A controls intended for that station when the glow is on cathode K1 of the station stepper tube. In addition, the station stepper causes the group A indications to be placed in the shift register at the beginning of the station period so that these indications may be stepped out of the shift register and transmitted back to the control office as the controls from the control office are being stepped into the shift register.

These various functions occur as the result of the application of the voltage then appearing on cathode K1 to a plurality of different circuit organizations. For example, the positive voltage appearing on cathode K1 is applied over wire 405 to the shift register indication mark gated amplifier (group A) 106. As a result, a gating voltage is applied over wire 107 to contacts of the group A indication relays 108 shown in Fig. 3D. In accordance with the operated conditions of these relays, voltage pulses appear selectively on wires 109 to 113, and these voltage pulses condition the various stages of the shift register respectively. The operated conditions of the various stages of the shift register 19 thus represent the indication code that is to be transmitted with the operated condition of stage No. 15 representing the first digit of the indication code and the operated condition of stage No. 1 representing the last digit of the indication code.

To render the decoding circuits responsive to the control code intended for the station, the positive voltage appearing on cathode K1 is applied over wire 91 to the shift register control mark gated amplifier 92 and also to the oscillator gate control 95. The function of the gated amplifier 92 is to supply to the first stage of the shift register 19 a single trigger pulse for each mark digit included in the code for that station. This gated amplifier 92 receives an input pulse from the delayed mark amplifier 79 over wire 93 for each carrier pulse received in the cycle. However, this gated amplifier 92 becomes effective to provide output pulses in response to the input pulses received over wire 93 only during the time that it is being gated by the voltage received over wire 91 from cathode K1. It thus becomes effective to supply input pulses to stage No. 1 of shift register 19 only for the control code marks intended for that station.

The shift register 19 is required to be supplied with timed pulses on buses 115 and 116, and these timed pulses must occur at the same repetition rate of 200 cycles per second that is employed at the control office in making up the control code. The application of these pulses to buses 115 and 116 controls the stepping of control digits into the shift register as well as the stepping of indication digits out of the shift register. Thus, these pulses must appear on buses 115 and 116 only throughout the station period corresponding to that station. This is accomplished by applying the gating voltage appearing on wire 91 to the oscillator gate control 95. This gate control renders the 200 cycle per second oscillator 96 operative throughout the station period on which controls are being received and indications transmitted. The sine wave output of this oscillator 96 is applied to the oscillator squaring amplifier 97 which is effective to produce a square wave of voltage output for each cycle of its sine wave input. Thus, the output of the oscillator squaring amplifier may be as shown at line J of Fig. 4A as it responds to a sine wave of input as illustrated at line I of Fig. 4A.

The square wave output voltage of the oscillator squaring amplifier 97 is applied to a shift pulse E-J flip-flop 98. This Eccles-Jordan type flip-flop circuit comprises a dual triode, bistable state, trigger circuit which operates to its "1" condition in response to the positive-going leading edge of each of its input pulses and back to its "0" condition on the negative-going trailing edge of each input pulse. The output voltage waveform that is thus obtained from one of the plate electrodes of this flip-flop 98 is illustrated at line K of this Fig. 4A. This voltage waveform is similar to that appearing at line J which illustrates the output of the oscillator squaring amplifier 97. However, the characteristics of the flip-flop trigger circuit and particularly its ability to change its state almost instantaneously cause the output voltage of this flip-flop to have very steep leading and trailing edges, and these are desirable for the operation of the shift register 19.

The output of this flip-flop circuit is applied over wire 99 to the intermediate shift trigger amplifier 100. This amplifier 100 merely inverts the square wave of voltage applied to it and causes this inverted voltage waveform to appear on bus 116 supplying the stages of the shift register 19. The voltage that thus appears on wire 116 has the waveform as indicated at line L of Fig. 4A.

The output of the flip-flop circuit 98 is also applied to the pulse inverter 101. This pulse inverter merely inverts its input voltage waveform and causes such inverted voltage to be applied to the main shift trigger amplifier 102. This amplifier 102 again inverts its input waveform with the result that the voltage appearing on bus 115 has the wave shape as illustrated at line K of Fig. 4A. A comparison of lines K and L of Fig. 4A makes it clear that at the time the voltage on either bus 115 or 116 is at a high level, the voltage on the other bus is at a low level and that this condition alternates between these two buses at the 200 cycle per second rate established by the oscillator 96.

The manner of operation of the shift register 19 will subsequently be considered more fully when the detailed circuits are being considered. Briefly, the shift register 19, which is assumed in the present embodiment of the invention to have sixteen stages (one more than the number of pulse periods in a station period), responds to the time-spaced code pulses applied to its stage No. 0 and, under the influence of the shift pulses appearing on buses 115 and 116, causes these time-spaced input pulses to be distributed in the various stages of the shift register in accordance with the pattern of the received code. Each stage of the shift register comprises a bistable state trigger circuit device which may be considered as being normally in its "0" condition but being operative also to a stable "1" condition. Each input pulse applied to stage No. 0 causes this stage to operate to its "1" condition. Before another code digit can be applied to this stage No. 1, shift pulses appear on buses 115 and 116 and restore stage No. 1 to its "0" condition. The restoration of stage No. 0 to its "0" condition causes stage No. 1 to operate to its "1" condition. Of course, if a space digit appears in the code so that no input pulse is applied to stage No. 0, this stage remains in its "0" condition. The shift pulses that then appear on buses 115 and 116 before the arrival of the next code digit cannot restore stage No. 0 to its "0" condition so that no pulse is applied to stage No. 1 to operate it to its "1" condition.

The shift pulses that appear in this way on buses 115 and 116 repeatedly cause any shift register stage in its "1" condition to transfer such "1" condition to the next higher numbered stage. In this way, a time-spaced code of input pulses may be stepped into the shift register in such a way that the operated conditions of the various stages represent the makeup of the received control code. For example, if the first and third digits of the received codes are marks but the second and fourth digits are spaces, then stages 15 and 13 of the shaft register will be in their "1" conditions when the complete code has been stepped into the shift register and stages 14 and 12 will then be in their "0" conditions.

If the various stages of the shift register have previously been selectively conditioned to respective "0" and "1" conditions in accordance with an indication code, the shift pulses appearing on buses 115 and 116 cause the stored indication code to be stepped out of the last stage No. 15 of the shift register and over wire 117 to the carrier transmitter 24. As an example, if the first and third digits of the indication code are intended to be mark pulses with the second digit a space pulse, stages 15 and 13 will initially be operated to their "1" conditions but stage 14 will be allowed to remain in its "0" condition.

Shift pulses appearing subsequently on buses 115 and 116 cause the condition of each stage to be successively transferred to the next. Each time that stage No. 15 is restored to its "0" condition, the carrier transmitter is controlled to supply its carrier frequency output to the line wires 10. Consequently, the first pair of shift pulses operate stage No. 15 from its "1" condition to its "0" condition, causing carrier frequency F2 to be transmitted for one-half of a pulse period. At the same time, the "0" condition of stage No. 14 is, in effect, transferred to stage No. 15, and the "1" condition of stage No. 13 to stage No. 14.

The next pair of shift pulses do not affect stage No. 15 because it is already in its "0" condition so that carrier frequency is not transmitted on this next pulse period. These shift pulses are effective, however, to transfer the "1" condition of stage 14 to stage No. 15. The next pair of shift pulses that then occurs result in the restoration of stage No. 15 to its "0" condition so that carrier frequency F2 is again transmitted for one-half of this next pulse period. In this manner, the indication code transmitted includes, in succession, for the first three digits a mark, followed by a space, followed by another mark as originally intended.

As the first pair of shift pulses, in effect, causes the indication digits stored in any stage to be transferred to the next higher numbered stage, the first stage of the shift register is assured of being in its "0" condition so that it may properly be controlled in accordance with the incoming control code digits. There is, consequently, no interference between the outgoing indication digits and the incoming control digits since the indication digits are being successively stepped into the higher numbered stages of the shift register, thereby leaving the lower numbered stages vacant so that they can handle the incoming control digits.

At the end of the station period on which group A controls are received at a station and its group A indications are transmitted, a station-call pulse is received which demarcates the end of the station period and the beginning of the next. In response to this station-call pulse, the station stepper tube transfers its glow from cathode K1 to cathode K10. During this station period and also during the following station period when the glow is on cathode K9, the controls which have just been received and are stored in shift register 19 are executed, i.e. they are made effective to control the group A control relays 20A. This is accomplished by supplying the positive voltage obtained from cathodes K10 and K9 to the group A control execution amplifier 120. As a result, there is applied during these two consecutive station periods a gating voltage to the group A control execution relay 121. The actuation of this execution relay 121 then causes the group A control relays 20A to become selectively responsive to the conditions of the various shift register stages.

On the following station period when the station stepper tube has the glow on cathode K8, no particular circuit function is performed although the station stepper synchronizing control 83 may, of course, be connected to this cathode or to any other cathode dependent upon the number of the field station.

During the next station period when a received station-call pulse has caused the glow on the station stepper tube 314 to transfer to cathode K7, a positive voltage is applied from this cathode K7 to the clear-out pulse amplifier 122. As a result, a voltage is applied over wire 123 to the main shift trigger amplifier 102. This voltage acts on this amplifier 102 and causes the voltage on bus 115 supplying the shift register to be at a high level at the same time that the voltage on bus 116 is caused to be at a high level. This condition results, as will later be described in detail, in the cancellation of all digits then stored in the shift register, i.e. each shift register stage is immediately restored to its "0" condition so that the shift register, is, in effect, cleared out.

Having been thus cleared out, the shift register is once more effective to receive a control code and transmit an indication code. Thus, when the next station period is initiated with the station stepper tube glowing at its cathode K6, the decoding circuits are once more rendered responsive to the received control code and the group B indications are placed in the shift register 19. Thus, a connection is provided from cathode K6 over wire 125 to the shift register indication mark gated amplifier (group B) 126. An enabling voltage is then caused to appear on wire 127, and this voltage is applied through contacts of the group B indication relays 128 to selectively condition the various shift register stages in accordance with the group B indication code to be transmitted.

At the same time, the oscillator gate control 95 is made effective to start the oscillator 96 with the final result that shift pulses are made to appear on buses 115 and 116 in a manner already described. Furthermore, the shift register control mark gating amplifier 92 is again gated over wire 91 by the positive voltage obtained from cathode K6 so that trigger pulses may be applied to the first stage of the shift register 19 for each mark pulses appearing in the control code during that station period. In this way, the group B controls for the station are stepped into the shift register so that the final permutation of the conditions of the stages corresponds to the time-spaced pattern of marks and spaces constituting the control code for that station. As before, the stepping of controls into the shift register by pulsing the buses 115 and 116 causes the indications to be transferred in succession to stage No. 15 with the result that the transmitter is modulated as required to form the indication code.

The group B controls received when the glow was on cathode K6 are executed during the following two station periods when the glow is on cathodes K5 and K4, respectively, of the station stepper tube. This execution of group B controls is accomplished by supplying the positive voltage existing during these two consecutive station periods on cathode K5 and K4 to the group B control execution amplifier 130. As a result, the group B control execution relay 131 is energized over wire 132. The group B control relays 20B are then made respectively responsive to the various stages of the shift register so that they can be selectively energized in accordance with the control code then stored in the respective shift register stages. Being thus selectively controlled, these relays are effective to operate the controlled devices 21, which may include switches, signals, and the like, to their desired conditions.

On the station period immediately following the two on which the group B controls are executed, the glow of the station stepper tube is on cathode K3. No particular system function is accomplished on this station period although a connection may be made from this cathode K3 to the station stepper synchronizing control 83 at certain of the field stations.

On the following station period when the cathode glow is on cathode K2, the shift register is again cleared of the group B controls then stored there. This is accomplished by again providing the positive voltage appearing on cathode K2 to the clear-out pulse amplifier 122 which then provides a control over wire 123 to the main shift trigger amplifier, which, in turn, controls the voltage appearing on the shift bus 115 and is thereby effective to restore all of the shift register stages to their respective zero conditions.

On the following station period when the cathode glow transfers to cathode K1, another cycle is begun and the same system functions are provided in the manner already described. In this way, the station stepper 86, by providing distinctive outputs for the various station periods, is able to accomplish a variety of system functions on the different station periods merely by providing connections from the respective cathodes of the single multicathode glow discharge tube to the various circuit organizations provided to accomplish these desired system functions.

DETAILED CIRCUIT DESCRIPTION

*Field station apparatus*

*Carrier receiver*.—The control code received at each field station from the control office as an interrupted carried frequency F1 (Fig. 4A, line A) is applied from the line wires 10 through band-pass filter 16 to the carrier receiver 17. This carrier receiver 17 includes a detector stage so that the output of the carrier receiver provides a low level of direct-current output voltage when carrier is being received and a higher level of direct-current voltage when no carrier is received. This output voltage of the carrier receiver 17 is applied through capacitor 270 to the control grid of tube 271 included in the carrier squaring amplifier 77.

*Squaring amplifier*.—Tube 271 is preferably of the kind such as a 6BN6 having the characteristic that a slight variation in its control grid voltage causes the tube to vary from a fully conductive to a fully nonconductive condition. Thus, when no carrier frequency F1 is being received at a field station, the control grid voltage of tube 271 is at a high level and the tube is then cut off so that its plate voltage is high. However, when the carrier frequency F1 is being received at a field station, the output voltage of the carrier receiver is at a low level so that tube 271 is cut off and its plate voltage is at a high level. The effect then is that the plate voltage of tube 271 provides a positive-going pulse for each pulse of carrier frequency F1 received at the field station, and the duration of such positive-going pulse equals the duration of the received carrier frequency as shown in 4A at line B.

*Mark multivibrator.*—Each such positive-going pulse is applied through capacitor 272, isolation diode 273, and resistor 274 to the control grid of tube 275 which is included in the mark multivibrator 78. Tubes 275 and 276 are interconnected to form a one-shot multivibrator similar to the one previously described in connection with the control office apparatus. Tube 276 is normally fully conductive and tube 275 nonconductive. Upon the positive-going leading edge of each pulse obtained from the plate of tube 271, the condition of the multivibrator is abruptly reversed so that tube 276 becomes cut off while tube 275 becomes fully conductive. The length of time that the mark multivibrator remains in this condition is selected to be greater than the 2½ millisecond interval during which the carrier frequency F1 is received on a mark digit control code but less than the 5 millisecond interval throughout which carrier frequency is received to form the distinctive synch and station-call pulses.

*Delayed mark amplifier.*—During the time that the mark multivibrator 78 is in its abnormal state with tube 275 conductive, the plate voltage of the nonconducting tube 276 is at a high level (see Fig. 4A, line C). When the mark multivibrator 78 restores itself to its normal condition, the plate voltage of tube 276 is abruptly reduced. The plate voltage of tube 276 is applied through capacitor 277 to the control grid of tube 278 included in the delayed mark amplifier 79. This amplifier 79 comprises a differentiator circuit similar to that previously described so that the negative-going voltage variation applied to the grid of tube 278 when the mark multivibrator is restored to its normal condition causes tube 278 to become nonconductive for a brief interval of time dependent upon the length of time required for capacitor 277 to be discharged to its new steady-state value. Thus, as indicated at line D of Fig. 4A, the delayed mark amplifier provides a positive-going trigger pulse whose leading edge is substantially coincident with the trailing edge of the positive-going output pulse obtained from the plate of tube 276.

*Synch and station-call pulse separator.*—Each of these positive-going trigger pulses obtained from the delayed mark amplifier 79 is applied through capacitor 279 to the control grid of tube 280 included in the synch and station-call pulse separator 80. This tube 280 is a pentode type of tube having its screen grid provided with the proper operating potential by a connection through resistor 281 to (B+). Both control and suppressor grids of this tube are normally biased negatively so as to prevent conduction of the tube by connections provided through resistors 282 and 283, respectively, to (B−) terminal. Only by the simultaneous occurrence of positive gating voltages on these control and suppressor grids can tube 280 be made conductive.

The control grid is driven momentarily positive to condition the tube to a conductive condition in response to each positive-going trigger pulse from the delayed mark amplifier 79. The suppressor grid, on the other hand, receives a positive gating voltage through capacitor 284 from the plate of tube 271 in the squaring amplifier 77. As can be seen from a comparison of lines D and B of Fig. 4A, the required gating voltages for tube 280 occur concurrently only at the time of either a synch or a station-call pulse. Thus, the squaring amplifier is still effective to provide a high output voltage to gate the suppressor grid at the time of occurrence of a positive trigger pulse from the delayed mark amplifier only for each synch or station-call pulse. For the shorter mark digits appearing in the control code, the output voltage of the squaring amplifier is already reduced to its normal low value at the time of occurrence of the associated trigger pulse from the delayed mark amplifier. As a result, tube 280 becomes momentarily conductive and effective to provide a negative-going trigger pulse at its plate only for either a synch or a station-call pulse, as indicated at line E of Fig. 4A.

Each negative-going trigger pulse from the plate of tube 280 is applied through capacitor 285 and resistor 286 to the control grid of tube 287 which together with tube 288 is included in the synch and station-call pulse multivibrator 81. This multivibrator operates in the same manner as the mark multivibrator 78. Tube 288 is normally conductive and tube 287 nonconductive. Upon the positive-going trailing edge of each pulse appearing at the plate of tube 280, the condition of conduction of these two tubes 287 and 288 is abruptly reversed. With tube 288 nonconductive, a positive-going voltage variation appears at the plate of this tube. The recovery time of this multivibrator 81 is selected to be of some nominal value so as to provide a positive voltage pulse at the plate of tube 288 as indicated at line F of Fig. 4A having sufficient duration to provide the required energy for an integrating circuit associated with the synch pulse separator 82.

*Synch pulse separator.*—The synch pulse separator 82 includes pentode tube 289 having its screen grid provided with proper operating potential by being connected through resistor 290 to (B+). Both the control and suppressor grids of the tube are negatively biased to an extent to prevent conduction of the tube by connections provided to a negative source of biasing voltage. The control grid is connected through resistor 291 and resistor 292 to the terminal (B—) and the suppressor grid is connected through resistors 293 and 294 also to (B—). For this tube to become conductive it is required that both its control and suppressor grids be concurrently gated with positive voltages each of sufficient amplitude to overcome the normal cutoff bias provided.

The positive voltage pulse obtained from the plate of tube 288 and applied through capacitor 295 and resistor 293 to the suppressor grid of tube 289 sufficiently raises the potential of this negatively biased grid to condition the tube for conduction. Each pulse obtained from the plate of the tube 288 is also supplied through an integrating circuit to the control grid of tube 289. This integrating circuit includes the capacitors 296, 297, and 298 and also the resistor 299. Each individual positive pulse obtained from the plate of tube 288 causes a charging of the capacitors 296 and 297 so that the control grid voltage of tube 289 is somewhat raised in potential but not sufficiently to enable the tube to become conductive.

When station-call pulses are received at a field station with the usual station period interval between successive pulses, the interval between the application of pulses through this integrating circuit to the control grid of tube 289 is sufficiently great so that the charge built up on the capacitors 296 and 297 by one pulse is substantially dissipated by the discharging of these capacitors before the arrival of the next such pulse. However, at the beginning of a cycle of operation when the synch pulse is immediately followed by the station-call pulse for station No. 1, two positive-going pulses are applied in quick succession from the plate of tube 288, through the integrating circuit, to the control grid of tube 289. The first of these pulses causes the integrating capacitors to be partially charged; upon the occurrence of the second of these pulses, the still charged integrating capacitors are further charged so that the control grid voltage of tube 289 is thereby sufficiently raised with respect to the cathode to condition this tube for conduction. Since the suppressor grid is positively gated by each of these pulses, tube 289 is properly gated at such time to become conductive. The momentary conduction of this tube that then results produces a voltage drop across its plate load resistor 300 so that a negative-going voltage pulse is applied over wire 301 and through capacitor 302 to the plate of gas discharge tube 303 included in the station stepper synchronizing control 83.

*Station stepper.*—The negative-going output pulses obtained from the synch and station-call pulse separator 80 illustrated at line E of Fig. 4A are applied over wire 85 and through capacitor 308 to the station stepper 86. These pulses are applied directly to the guide electrode 309 and are also applied through the pulse delay 87 to a similar guide electrode 310.

The pulse delay 87 includes resistors 311 and 312 as well as the capacitor 313. In its normal condition, the capacitor 313 is fully discharged so that the guide electrode 310 is at ground potential. When a negative-going pulse appears on wire 85, capacitor 313 charges negatively so as to decrease the potential at the guide electrode 310. The voltage across capacitor 313 cannot change immediately, however, so that the guide electrode 310 reaches its maximum negative potential some time after the other guide electrode 309 has reached its maximum negative potential. In this way, each negative-going pulse on wire 85 immediately produces a negative pulse on the guide electrode 309 and shortly thereafter another pulse on the guide electrode 310. In response to these pulses, the glow may be transferred from any cathode to an adjacent cathode in a prescribed direction. With the pulse on the guide electrode 310 somewhat delayed with respect to that on electrode 309, the transfer of glow from cathode to cathode proceeds in the direction of the arrow shown, i.e. from any cathode to the next lower numbered cathode. These cathodes are arranged in a circular pattern about the anode of the tube so that actually cathode K10 is adjacent cathode K1. Thus, a pulse appearing on bus 85 when the glow is on cathode K1 causes the glow to be transferred directly to cathode K10.

The general structural organization of the multicathode tube 314 included in the station stepper 86 and also its general manner of operation are described in an article appearing in the November 1953 issue of the magazine "Electronics." This article, titled "Polycathode Counter Tube Applications" describes in greater detail the manner in which the glow is transferred from cathode to cathode in response to the application of input pulses to the tube.

When the glow is on a particular cathode of tube 314, there is a flow of current from the plate of the tube to that particular cathode so that a voltage drop appears across the resistor connected in series with the cathode. Since the glow is transferred from one cathode to the next only in response to the station-call pulses, the glow remains on any cathode, causing the voltage on that cathode to be at a high level, for the duration of a single station period. On the various station periods, different system functions are to be performed. This is accomplished by applying the positive voltage appearing at selected cathodes of tube 314 and applying these voltages as gating voltages to particular circuit organization which accomplish the desired result.

As previously explained, it is necessary that the station stepper at each station have the glow of its tube 314 at the proper cathode at the beginning of the cycle. To accomplish this, connections are provided from two adjacent cathodes of tube 314 to the station stepper synchronizing control 83. The connections shown in Fig. 3A are those which would be provided at field station No. 2. At this field station the glow is required to be on cathode K2 during the synch pulse period and the group A-station No. 1 station period of a cycle. For this reason, a connection is provided from cathode K3 of tube 314, through the isolation rectifier 315, capacitor 316, and resistor 317, to the grid of tube 318. Also, a connection is provided from the plate output circuit of tube 303 to cathode K2.

At station No. 2, the glow is normally at cathode K3 at the end of each cycle. Thus, the next pulse appearing on wire 85 and applied to tube 314 corresponds to the synch pulse and causes the glow to transfer from cathode K3 to cathode K2.

On the station period that the cathode glow is on cathode K3, the rise in potential of cathode K3 produces a corresponding increase in grid voltage of tube 318. This tube is normally biased to cutoff by the connection provided from its control grid through resistors 317 and 319 to (B−). However, when the glow is on cathode K3, tube 318 conducts so that its plate voltage decreases and causes a negative pulse to appear on the grid of gas discharge tube 303. This negative-going voltage pulse can have no effect upon the conduction of tube 303, since this tube is already biased to a nonconductive condition by a connection provided from its grid, through resistor 326, to (B−).

When the occurrence of the synch pulse at the beginning of the next cycle causes the flow to transfer from cathode K3 to cathode K2, there is an abrupt decrease of voltage at cathode K3 which causes tube 318 to become momentarily nonconductive. Its plate voltage then rises abruptly so that a positive-going voltage pulse appears on the grid of tube 303 causing this tube to be fired.

The plate of tube 303 is normally at ground potential since it is connected through the resistor 322 directly to ground. The required high plate-cathode voltage required for the tube to fire is provided by connecting the cathode of this tube through resistor 323 to the (B−) terminal. As a result, when tube 303 becomes conductive, its normally grounded plate which is connected to cathode K2 becomes substantially negative with respect to ground. The cathode K2 then assumes a sufficiently negative voltage with respect to all the other cathodes of this tube to ensure that conduction will take place only between this cathode K2 and the anode. It is thus assured that, under normal operating conditions, the occurrence of the synch pulse at the beginning of each cycle will result in the placing of the glow, at field station No. 2, on cathode K2 rather than on any other cathode of the tube.

The first station-call pulse which immediately follows the synch pulse produces a negative-going voltage variation at the plate of tube 289 in the synch pulse separator 82. This negative pulse, applied through capacitor 302 to the plate of tube 303, causes this tube to be extinguished. As a result, there is no longer any flow of plate current through resistor 322 associated with cathode K2. Cathode K2 is then no longer held at a potential below ground but is instead allowed to rise to a positive potential as determined by the flow of cathode current through resistor 322.

If the station stepper 86 at any field station gets out of synchronism at any time, it is assured of being quickly brought back into a synchronized condition. At any field station which is operating out of synchronism, the stepping operation of the station stepper 86 eventually causes a positive-going voltage to be applied to the station stepper synchronizing control 83. This causes tube 303 to be fired so that the glow is then maintained on a particular cathode of the tube as selected by the connections between this synchronizing control 83 and the station stepper 86. At the field station No. 2 shown in Fig. 3A, for example, the operation of the station stepper 86 as it responds to trigger pulses received from the synch and station-call pulse separator 80 eventually causes the cathode glow to transfer from cathode K3 to cathode K2. This causes tube 303 in the station stepper synchronizing control 83 to be fired as already described. The firing of tube 303 so lowers the potential of cathode K2 that the glow is assured of being on this cathode and on no other cathode of the tube. Tube 303 remains fired, holding the glow continually on cathode K2, until the occurrence of the output pulse obtained from the synch pulse separator 82 at the beginning of a new cycle of operation. With tube 303 thus extinguished, the potential at cathode K2 can assume the positive potential it ordinarily assumes when the glow is on this cathode. In this way, the station stepper 86 starts the new cycle with the glow on the cathode K2 as required.

During the time that the glow is on a particular cathode of the station stepper tube, one or more circuit functions may be performed, and these are initiated by the positive voltage appearing on that cathode at such time. One or more system functions may be performed at certain of the field stations during the first station period of the cycle. As already described, the cathode at which the glow is located during the first station period of a cycle also has the glow during the synch pulse period of the cycle. During the synch pulse period, however, that cathode has its potential maintained below ground by reason of the conduction of gas discharge tube 303. This negative potential at the cathode of the station stepper tube cannot produce the required gating so that any system function cannot be accomplished until tube 303 is extinguished by the output pulse from the synch pulse separator 82. The system function can thus be accomplished only during the first station period of the cycle and not on the synch pulse period.

*Oscillator gate control.*—On the two station periods during which controls are received at any field station, the multicathode glow tube of the station stepper 86 has its glow on either cathodes K1 or K6 depending upon whether the group A or group B controls and indications respectively, are being transferred. On both of these station periods, the positive voltages existing at cathodes K6 and K1 are applied through capacitor 330 and over wire 331 and resistor 332 to the control grid of tube 333 included in the oscillator gate control 95. Tube 333 normally is biased to cutoff because of the connection provided for its control grid through resistor 334 to the (B−) terminal. When in this normal nonconductive condition, this tube has a relatively high plate voltage because there is then no voltage drop through the plate load resistor 335. When, however, a positive gating voltage is applied to the control grid of tube 333 on selected station periods, this tube becomes conductive so that its plate voltage is abruptly reduced and remains at such low value throughout the entire station period.

*200 c.p.s. oscillator.*—The 200 c.p.s. oscillator 96 is of the kind known as a pulsed Colpitts oscillator. This oscillator comprises the two triode tubes 336 and 337 with the tube 336 having a frequency determining resonant circuit in its cathode circuit. This resonant circuit includes the inductor 338 and capacitors 339 and 340. The grid of tube 336 tends to be normally at about ground potential since this grid is connected through resistor 341 to ground. Under these conditions, the oscillator is inoperative. The discharging of capacitor 342 that occurs when tube 333 becomes conductive results in a lowering of the grid potential of tube 336 which is sufficient to render tube 336 nonconductive. With tube 336 nonconductive, a 200 c.p.s. sinusoidal output voltage appears at the grid of tube 337, and this voltage is applied through resistor 343 to the control grid of tube 344 included in the oscillator squaring amplifier 97. The oscillator 96 has its resonant circuit adjusted to operate at the same rate as the oscillator provided at the control office, i.e. at 200 cycles per second in one specific embodiment of this invention. The characteristics of the oscillator 96 are such that the sinusoidal output voltage always is initiated with a negative half cycle as illustrated at line I of Fig. 4A.

*Oscillating squaring amplifier.*—Tube 344 included in the squaring amplifier 97 is readily driven between conductive and nonconductive conditions by the sine wave of voltage it receives from oscillator 96. As a result, a substantially square wave of output voltage is obtained from the plate of tube 344 as this tube is driven to cut off on the negative half-cycles of its input voltage wave and to saturation on the positive half-cycles of its input voltage wave. The voltage that thus appears at the plate of this tube is applied through capacitor 345 to the control grid of tube 346 included in the shift pulse E-J flip-flop 98 is substantially as illustrated at line J of Fig. 4A.

*Shift pulse Eccles-Jordan flip-flop.*—The Eccles-Jordan flip-flop circuit 98 is of a conventional type comprising the two interconnected triode tubes 346 and 347. This trigger circuit has two stable conditions, one in which tube 346 is conductive with tube 347 cut off and the other condition in which these relative conductive conditions are reversed. Upon each positive-going voltage variation at the plate of tube 344, a positive pulse appears at the grid of tube 346 which tends to make this tube conductive with the result that tube 347 becomes cut off. Each negative-going voltage variation at the plate of tube 344 produces a negative-going trigger pulse at the grid of tube 346 causing this tube to become cut off and tube 347 conductive. In this way, the flip-flop trigger circuit 98 is made to operate alternately between its opposite conditions at a rate established by the oscillator 96.

*Intermediate shift trigger amplifier.*—The output voltage appearing at the plate of tube 347 of the flip-flop circuit 98 is applied over wire 99 to the intermediate shift trigger amplifier 100. When the output voltage of the oscillator squaring amplifier 97 arises, tube 346 becomes conductive and tube 347 nonconductive so that the voltage obtained from the plate of tube 347 rises also. Thus, the voltage applied to the grid of tube 350 and over wire 99 to the grid of tube 348 may be considered as being considered as being in phase with the voltage at the plate of tube 344; this latter voltage waveform is as shown at line J of Fig. 4A. The wire 99 connects directly to the control grid of triode amplifier tube 348 which acts as an inverter amplifier so that the voltage at the plate of this tube is actually the inverse of that applied to its control grid. The waveform of voltage appearing at the plate of this tube 348 and applied to bus 116 corresponds to that shown at line L of Fig. 4A.

*Pulse inverter and main shift trigger amplifier.*—The voltage at the plate of tube 347 is also applied through a coupling resistor 349 to the control grid of triode amplifier tube 350 included in the pulse inverter 101. The pulse inverter 101 provides at the junction of its plate load resistors 351 and 352 a voltage which is the inverse of that applied to its control grid. The inverted voltage is then applied directly to the control grid of triode amplifier tube 353 included in the main shift trigger amplifier 102. This amplifier stage 102 also inverts its input waveform to provide an output voltage on bus 115 which is as shown at line K.

The maximum voltage on both buses 115 and 116 must be limited to some preselected value. If this is not done, the cathodes of the tubes included in the shift register may be raised so high with respect to their plates that they will be fired in the reverse direction. The maximum voltage appearing on bus 115 when tube 353 is nonconductive is fixed by the voltage at the junction of the voltage dividing resistors 354 and 355. Any transient voltage variation tending to appear on this bus and raise the voltage above the preselected maximum value causes a flow of current through rectifier 356 shunting the plate load resistor 357. This prevents the voltage on bus 115 from rising above the preselected value.

As shown in Fig. 4A, the output of the oscillator squaring amplifier 97 is at a maximum during the negative half-cycles of the output of oscillator 96 and is a minimum during the positive half-cycles of the oscillator output. Each positive-going pulse edge shown in line J acts upon the flip-flop trigger circuit 98 to make tube 346 conductive. Thus, the first negative half-cycle of the output of oscillator 96 is assured of operating the flip-flop 98 to the condition where tube 347 is nonconductive so that a high voltage is applied to the control grid of tube 350. The conduction of tube 350 that then results causes a low voltage to appear at the control grid of tube 353. The low conductive state of tube 353 then causes this tube to supply a relatively high voltage to bus 115 as shown at line K of Fig. 4A. At the same time, the high plate voltage of tube 347 causes tube 348 to be highly conductive so that a relatively low voltage appears on the intermediate shift trigger bus 116 as shown at line L of Fig. 4A. On each positive half-cycle of the output of oscillator 96, the relative conductive conditions of the various tubes are reversed so that the voltage on the main shift trigger bus 115 is at a low level and the voltage appearing on the intermediate shift trigger bus 116 is at a high level. Consequently, as the oscillator continues to operate, the voltage on buses 115 and 116 varies alternately between two levels in the manner shown at lines K and L of Fig. 4A.

*Shift register.*—Most of the system functions which are accomplished by the station stepper 86 throughout a cycle of operation relate to the operation of the shift register. Before discussing in detail how these various system functions are accomplished, it is believed expedient, therefore, to describe the circuit organization and manner of operation of this shift register.

The shift register of the present invention shown in detail in Fig. 3C comprises a plurality of stages with one being provided for each of the fifteen pulse periods included in a station period with an additional No. 0 stage. In Fig. 3C, stages Nos. 0 to 3 and stages Nos. 14 and 15 only are shown; the remaining stages of the shift register are identical to those illustrated.

Each shift register stage comprises two grid controlled, cold cathode, glow discharge tubes. The storage tube of each stage such as tube 368 of stage No. 1 provides for the storage of the various code digits; the intermediate tube of each stage such as tube 361 in the stage No. 0 provides an intermediate or temporary storage of each digit as it is transferred from one stage to the next.

Each storage and each intermediate tube in the shift register is controllable to either of two distinctive conditions; one where the tube is in a stable conductive condition, and the other in which the tube is in a stable nonconductive condition. These conductive and nonconductive conditions correspond, respectively, to the "1" and "0" conditions established by the customary binary notation. When storing a mark code digit, the storage tube of any stage is in its conductive or "1" condition; when storing a space digit, it is in its nonconductive or "0" condition.

The cathode of each of the storage tubes is connected directly to bus 115, and the cathode of each intermediate tube is similarly connected to bus 116. The plate of each storage and each intermediate tube is connected through a plate load resistor to (B+). The grid of each tube is connected through a resistor and rectifier in parallel to a bus 362. The grid of tube 360 is connected, for example, through the parallel-connected resistor 363 and rectifier 364 to bus 362 which is connected to the junction of resistors 365 and 366. This voltage divider provided by the resistors 365 and 366 connected between (B+) and ground provides a positive bias for the grid of each tube in the shift register for reasons which will be later more fully described. Resistor 366 in this voltage divider is shunted by a capacitor 367 whose purpose is to prevent any abrupt variations in the voltage on bus 362 as might be produced by transient variations in the (B+) power supply.

Each of the storage tubes other than the one included in stage No. 0 receives an input from the plate of the intermediate tube associated with the immediate preceding stage. As an example, the storage tube 368 of stage No. 1 receives an input through capacitor 369 from the plate of the intermediate tube 361 included in stage No. 0. Each intermediate tube, on the other hand, receives an input to its grid from the plate of the storage tube of the same stage. The grid of intermediate tube 361 receives its input through capacitor 370 from the plate of storage tube 360 also in stage No. 0. In contrast, the storage tube of stage No. 0 receives an input for its control grid through capacitor 371 from the shift register control mark gated amplifier 92. As will later be described in detail, a positive-going trigger pulse is obtained from this gated amplifier 106 for each mark digit appearing in the control code for the particular field station under consideration.

The shift buses 115 and 116 are alternately pulsed with positive voltages so that when one bus is at a low potential, the other is at a high potential, and this condition is reversed back and forth at a rate established by the oscillator 96. Normally, however, as shown in Fig. 4A at lines K and L, bus 115 is at a low potential and bus 116 is at a high potential. This means that the cathode of each storage tube is at a low positive potential with respect to ground. A comparison of lines E, G, and L of Fig. 4A shows that the delayed mark amplifier 79 of Fig. 3A provides a positive-going output pulse for each mark in the control code and that these trigger pulses are suitably delayed so that each one occurs at a time when the voltage on the main shift bus 115 is at a low level.

The first of such trigger pulses to occur during a station period momentarily raises the potential of the grid of tube 360 sufficiently with respect to the cathode to cause this tube to fire. In cold cathode tubes of this kind, the grid must be driven positively with respect to the cathode for the tube to fire. Since each of these tubes is provided with a positive biasing voltage from bus 362, a positive pulse of only moderate amplitude need be applied to the control grid to cause the tube to fire. This positive biasing voltage must of course not be so great as to cause the tube to fire in the absence of an external pulse.

The conductive condition of tube 360 exists only temporarily since the voltage on bus 115 is soon raised to a sufficient amplitude with respect to the plate of this tube so that conduction can no longer be sustained. As a result, the tube is extinguished, and the voltage at its plate which was at a low level while the tube was conducting, abruptly rises to a higher level substantially equalling that provided by the (B+) source of voltage.

At the same time that the voltage on bus 115 is raised, the voltage on bus 116 is lowered. Consequently, the positive-going voltage variation at the plate of tube 360 which is applied through capacitor 370 and is effective to produce a positive-going pulse at the grid of tube 361 raises the grid potential of tube 361 sufficiently with respect to the now substantially grounded cathode to fire tube 361.

A short time later, the voltage on bus 116 is raised simultaneously with the lowering of voltage on bus 115. The low plate-cathode voltage of tube 361 that then results is insufficient to hold this tube conductive so that it is extinguished. Its plate voltage then abruptly rises so that a positive-going trigger pulse appears at the grid of tube 368 which is the storage tube of stage No. 1. This pulse can now cause tube 368 to become conductive since the cathode of this tube is at a low potential by reason of the low voltage now appearing on bus 115. Any tube in the shift register not in a conductive condition is not affected by the rise in potential of the associated shift bus so that it cannot provide a pulse to any other tube to fire such tube.

The rate at which the shift pulses are applied to buses 115 and 116 is established by the oscillator 96 of Fig. 3B as already mentioned, and this oscillator is made to operate at the same frequency as the oscillator 35 at the control office. In this way, the occurrence of the shift pulses is synchronized with the received control code digits is such a way that bus 115 is always at a low level of potential as each pulse is applied to the tube 360 of the first shift register stage from the shift register control mark gated amplifier 92.

Between successive pulse periods, the shift pulses first cause the potential of bus 115 to be raised, thereby causing any storage tube in a conductive condition to transfer this condition to its associated intermediate tube, and then the raising in potential of bus 116 that follows causes the conductive condition of any intermediate tube to transfer to the storage tube of the following stage.

From this description, it can be seen that the two shift pulses occurring between successive pulse periods cause the particular condition of each shift register stage to be transferred to the next higher numbered stage in the sense that the conductive condition of one storage tube results in the conduction of the storage tube of the next succeeding stage; whereas, any storage tube in a nonconductive condition transfers no input to the next stage so that the next stage remains nonconductive.

As an example of this mode of operation, it is shown at line N of Fig. 4A that the first positive-going trigger pulse obtained from the gated amplifier 92 and applied to the first stage of the shift register occurs at a time when the voltage on bus 115 is at a low level (see line J) and causes the conduction of the storage tube of the first stage as shown at line 0 of Fig. 4B. Shortly thereafter, the potential of bus 115 is raised so as to extinguish the storage tube of stage No. 0, and this results in the firing of the intermediate tube of this stage as indicated at line P. Following this, the potential on bus 116 is raised while the voltage on bus 115 is lowered to its original level. This results in the extinguishing of the intermediate tube of the first stage and the firing of the storage tube of the second stage. At this time, no input pulse is applied to the storage tube of the first stage from the gated amplifier 92 so that this tube is not fired. When the voltage on bus 115 is again raised, there is then no output applied from the storage tube to fire the associated intermediate tube of the first stage.

A single pair of shift pulses occurs on buses 115 and 116 at the conclusion of the last pulse period because the generation of these pulses can be terminated only by the occurence of the next station-call pulse. If the shift register included only one stage for each pulse period, the first-received digit would be stepped out of the No. 15 stage by the last pair of shift pulses. By providing the additional No. 0 stage, the first received digit is stepped into stage No. 15 by the last pair of shift pulses and the last-received digit is then transferred from stage No. 0 to stage No. 1.

It may thus be considered that the application of the shift pulses to all stages of the shift register on successive pulse periods, while a time-spaced code of input pulses selectively fires the storage tube of the first stage, causes the time-spaced code to be stepped into the shift register. With the completion of the stepping operation, the first received digit from the gated amplifier 92 resides in the last stage of the shift register, while the last received code digit is located in the first stage.

This stepping operation produced by the application of shift pulses to the buses 115 and 116 may, as in the present embodiment of this invention, also be utilized for stepping an indication code out of the shift register. Thus, at the beginning of a station period, a positive-going trigger pulse is obtained from a gated amplifier and applied through contacts of one of the groups of indication relays to the various shift register stages Nos. 1 to 15. For example, at the beginning of the station period on which group A controls are being received, a positive-going trigger pulse is obtained from the shift register indication mark gated amplifier (group A) 106 and is applied over bus 107 and through contacts of the group A indication relays 108 to the respective shift register stages. The manner in which this pulse is provided in response to a control received from the station stepper 86 will later be described in detail.

For each indication relay that is in a picked-up condition the positive-going trigger pulse appearing on bus 107 is applied through a front contact of such relay and a series-connected neon lamp to the grid of the storage tube of a corresponding stage of the shift register. For example, if the relays 375 and 377 of the group A indication relays are picked up, the positive-going trigger pulse on bus 107 is applied through front contacts 380 and 381 respectively of these relays as well as through the respective neon lamps 382 and 383 to the storage tubes 368 and 385 included in shift register stages Nos. 1 and 3. Similarly, if the group A indication relays 376, 378 and 379 are dropped away, their front contacts will be opened so that the positive-going trigger pulse on bus 107 cannot be applied to make conductive the storage tubes of the second, fourteenth, and fifteenth shift register stages. On a subsequent station period, when group B controls are being received at the field station, the similar positive-going trigger pulse on bus 107 is effective at that time to selectively fire the storage tubes of the various shift register stages in accordance with the operated conditions of the various group B indication relays.

With the storage tubes of the various shift register stages selectively conditioned in this manner in accordance with an indication code at the beginning of a station period, the shift pulses on bus 115 and 116 are effective during that station period to step the indication code digits from stage to stage. The result is that the final stage No. 15 has its tubes made selectively conductive and nonconductive on successive pulse periods in a time-spaced pattern corresponding exactly to the particular indication code placed in the shift register at the beginning of the station period. This transfer of the code digits from one stage of the shift register to the next is accomplished in the same manner as is the transfer of control digits which are applied in a time-spaced code pattern to the first stage. This action has been described in detail so that it is not deemed necessary to describe it again in detail in connection with the indication code.

It will now be described how various system functions relating to the operation of the shift register are accomplished through operation of the station stepper 86.

On the particular station period during which the group A controls are received from the control office and group A indications are transmitted back to the control office, the glow is on cathode K1 of the multicathode tube employed in the station stepped. The positive voltage that appears then on this cathode K1 is applied through an isolation rectifier 390 and through capacitor 330 to wire 331. From wire 331, this positive voltage is applied to the input of the oscillator gate control 95 in a manner already described in detail. This causes the oscillator 96 to become operative with the final result that the shift pulses appear on buses 115 and 116.

The positive voltage pulse appearing on wire 331 is also applied to the control grid of gas discharge tube 391 included in the shift register control mark gated amplifier 92. Since the capacitor 330 has a relatively large value of capacitance, the time constant for charging this capacitor is correspondingly long so that the positive voltage obtained from cathode K1 causes the grid potential of tube 391 to remain elevated above the normal negative biasing potential provided by the connection of the grid through resistor 392 to (B−) for substantially the entire station period. Thus, it may be considered that throughout the entire station period on which the glow is at cathode K1, the gas discharge tube 391 has its control grid positively gated so that it can become conductive in response to a positive-going pulse applied to its shield grid.

The shield grid of tube 391 receives the positive-going trigger pulses shown in line D of Fig. 4A. These are obtained from the delayed mark amplifier 79 of Fig. 3A and applied to the shield grid through capacitor 393. This shield grid is normally biased negatively by being connected through resistor 394 to the (B−) voltage supply. Each positive-going trigger pulse applied to the shield grid raises its potential sufficiently so that the tube will be fired provided that the control grid is being properly gated on that station period.

The plate of tube 391 is connected through a resistor 395 and parallel capacitor and the primary winding of transformer 396 to (B+). The inductive effect of the primary winding of this transformer 396 in the plate circuit of gas tube 391 results in the generation of an induced voltage in the plate circuit of this tube each time that is becomes conductive, and this induced voltage tends to reduce the plate voltage momentarily to such a low level that condition can no longer be sustained and the tube is then extinguished. As a result of this self-extinguishing characteristic, the gas tube 391 is conductive only momentarily for each trigger pulse applied to its shield grid.

Each time that the plate of tube 391 conducts current, a voltage is induced in the secondary winding of transformer 396. A positive-going voltage variation is then applied over wire 397 to the grid circuit of the storage tube 360 provided for the shift register stage No. 0. Any negative-going voltage variations induced in the secondary of transformer 396 and tending to appear on wire 397 are effectively short-circuited by the rectifier 398 connected directly across the terminals of the secondary winding of the transformer. Wire 397 is connected through the clamping diode rectifier 403 to the junction of the voltage dividing resistors 399 and 400 connected in series between (B+) and ground. This causes the upper level of the voltage on wire 397 to be clamped to the level of the voltage at the junction of these resistors 399 and 400 and thereby prevents the voltage on wire 397 from exceeding a suitable value. Capacitor 401 shunting the resistor 400 tends to prevent any abrupt voltage changes from appearing on wire 402.

During the time that cathode K1 of the station stepper 86 is at an elevated potential, a positive gating voltage is applied over wire 405 and through capacitor 406 to the control grid of the gas discharge tube 407 included in the shift register indication mark gated amplifier (group A) 106. This control grid is also normally biased negatively to an extent to prevent the tube from firing by a connection provided through resistor 408 to (B−). The positive voltage from cathode K1 raises the control grid potential of tube 407 throughout the station period on which the glow is on cathode K1 so that the tube can become fired provided that the potential of its normally negative biased shield grid is raised. The shield grid of this tube 407 is connected through capacitor 409 and over wire 410 to the plate of tube 287 included in the synch and station-call pulse multivibrator 81. Normally, the plate of tube 287 is at a high level of voltage because this tube is normally in a nonconductive condition. Upon the occurrence of each synch or station-call pulse in the cycle, however, tube 287 becomes conductive for a brief interval so that its plate voltage is reduced to a low level. Capacitor 409 then discharges and a negative-going voltage pulse appears on the shield grid of tube 407, but this negative-going pulse has, of course, no effect upon the conduction of tube 407. When the multivibrator 81 restores itself to a normal condition so that tube 287 once more becomes nonconductive, its plate voltage abruptly rises so that capacitor 409 again charges with the result that a positive-going pulse appears on the shield grids of both tubes 407 and 411. Of these two tubes, only tube 407 has its control grid positively gated by reason of the glow being on cathode K1 of the station stepper so that only tube 407 is fired at this time. Tube 407 remains fired only momentarily since it is organized to be self-extinguishing in the same manner as described for tube 391.

In a manner similar to that described for the gated amplifier 92, the firing of tube 407 causes a positive-going pulse to be applied over wire 107 to the contacts of the group A indication relays shown in Fig. 3D. As described in connection with the operation of the shift register, this pulse on wire 107 causes the various stages of the shift register to be properly conditioned at the beginning of the station period in accordance with the desired code pattern to be transmitted to the control office on that station period. The connection with respect to the secondary winding of transformer 404 differs somewhat from that of transformer 396. Transformer 404 has the lower terminal of its secondary winding connected directly to the junction of resistors 399 and 400. Thus, a positive biasing potential appears on bus 107, and this biasing potential aids in the firing of the various shift register cold cathode tubes.

During the two station periods that the glow is on cathodes K10 and K9 of station stepper 86, a positive voltage is applied through capacitor 412 to the grid of triode tube 413 included in the group A control execution amplifier 120. The grid of tube 413 is normally biased to cutoff by being connected through a resistor 414 to (B−). Being thus cut off, there is no flow of plate current through the plate load resistor 415 which is connected to (B+), nor is there any flow of plate current through resistor 416 and the winding of the group A control execution relay 121 which has its other terminal also connected to (B+). During the two station periods that the glow is on cathodes K10 and K9, however, the grid potential of tube 413 is raised sufficiently to cause this tube to conduct. As a result, current flows from (B+), through the winding of relay 121, through resistor 416 and the plate cathode circuit of the tube 413, to ground. As a result, this relay is picked up at the beginning of the station period on which the glow transfers to cathode K10 and remains energized throughout this station period and the following one until the glow transfers to cathode K8. The effect of picking up this relay 121 on execution of the controls stored in the shift register will subsequently be described in detail.

No system function is ordinarily provided when the glow of the station stepper 86 is on cathode K8. At certain of the field stations, however, a connection is made from this cathode K8 to the station stepper synchronizing control 83 for reasons already described.

On the following station period when the glow has transferred to cathode K7, a positive gating voltage is applied over wire 325 and through capacitor 417 to the control grid of the gas discharge tube 418 included in the clear-out pulse amplifier 122. The grid of this tube 418 is connected through a resistor 419 to (B−). The cathode and shield grid are both connected to the junction of resistors 420 and 421 connected in series between (B−) and ground, and as a result of this connection, the cathode and shield grid are both maintained at a potential substantially negative with respect to ground. Capacitor 422 shunting resistor 421 tends to prevent any abrupt voltage variations such as might be caused by transient variations in the voltage supply from appearing on cathode and shield grid of tube 418.

Although the cathode of tube 418 is maintained at a negative potential, the control grid, by being directly connected through resistor 419 to (B−) is at a still more negative potential so that the tube is normally biased to a cutoff condition. However, when the potential of cathode K7 is raised, the control grid voltage of tube 418 rises sufficiently with respect to the cathode voltage so that this tube will be fired. Because of the relatively large negative voltage appearing on the cathode, the plate voltage also becomes substantially negative when the tube is fired so that the grid voltage of tube 353 included in the main shift trigger amplifier 102 is suddenly driven to cutoff. Normally, this tube 353 is conductive so that a low voltage appears on bus 115 which connects to all the storage tubes in the shift register. When tube 353 is cut off by the firing of tube 418, the plate voltage of tube 353 rises to a high value so that that the cathode voltage of each of the storage tubes in the shift register is raised to such a high level with respect to the plate that conduction cannot be sustained and they are all extinguished. A high voltage appears upon the bus 116 at this time also so that none of the intermediate tubes of the shift register whose cathodes are connected to bus 116 can become conductive as an associated storage tube is extinguished. In this way, the cutting off of tube 353 so that buses 115 and 116 are both at a high potential ensures that all the storage and intermediate tubes of the shift register are restored to nonconductive conditions. Any previously received control code is thus cancelled from the shift register so that the shift register is properly conditioned to receive a new indication code for stepping out of the shift register and for receiving a new control code to be stepped into the shift register.

The system functions that are accomplished when the glow is on cathode K6 of station stepper 86 are similar to those occurring when the glow is on the cathode K1. Thus, positive gating voltages are applied through capacitor 330 and over wire 331 to the oscillator gate control 95 and to the shift register control mark gated amplifier 92. Also, a positive gating voltage is applied over wire 425 to the shift register indication mark gating amplifier (group B) 126. Thus, when the shield grid of tube 411 is positively gated by a trigger pulse received from the synch and station-call pulse multivibrator 81 at the beginning of the station period, a pulse is produced on wire 127, and this pulse is then selectively applied through contacts of the group B indication relays of Fig. 3D to the various stages of the shift register. In this way, an indication code is applied to the shift register whose digits correspond to the operated conditions of the group B indication relays.

During the two following station periods when the glow is on cathodes K5 and K4 of station stepper 86, a positive gating voltage is applied over wire 426 and through capacitor 427 to the control grid of tube 428 included in the group B control execution amplifier 130. This gating voltage makes tube 428 conductive so that there is a flow of plate current of this tube through the winding of the group B control execution relay 131 of Fig. 3C. Thus, on these two station periods, the relay 131 is picked up so that the group B controls stored in the shift register may be executed in a manner to be described.

No particular system function is accomplished on the station period during which the glow is on cathode K3 of the station stepper 86. However, as shown in Fig. 3A, at certain of the field stations, a connection may be provided from this cathode K3 to the station stepper synchronizing control 83.

During the next station period, when the glow is on cathode K2 of station stepper 86, a positive gating voltage is again applied over wire 325 to tube 418 of the clear-out pulse amplifier 122. Exactly as in the manner already described, the firing of tube 418 causes the voltage on bus 115 to be raised to a high level at the same time that the voltage on bus 116 is already at a high level so that all of the tubes of the shift register are restored to their normal nonconductive conditions, and the shift register may be considered as being cleared out of any previously received controls.

*Execution of controls.*—Each control code received at a field station and stepped into its shift register is subsequently executed by selectively controlling the various control relays in accordance with the conditions of the various shift register stages. After the group A controls have been received, the group A control relays are made responsive to the conditions of the shift register stages; the group B control relays are similarly made responsive to the conditions of the shift register stages immediately after the group B control codes have been stepped into the shift register.

As described in connection with the control matrix and control levers of the control office apparatus, the particular code characters transmitted on the first two pulse periods of a station period may be determined in accordance with the position of a two position switch or control lever. This switch selects whether a mark digit appears on the first or second pulse period of the code; a space digit is then transferred on the remaining pulse period. These first two digits of the control code are eventually stored in shift register stages Nos. 15 and 14 in accordance with the description already given of the shift register. It will be shown how the codes of these last two stages of the shift register may be made effective to control the operation of a single control relay in either the group A or the group B bank of control relays.

A three-position control lever may also be readily used as has been described to select on which of three successive pulse periods a mark character shall be transmitted. The detailed circuits of the control office apparatus show how such a three-position control lever determines the make-up of the control code transmitted on the last three pulse periods of a station period. Since the last three code digits are eventually stored in the shift register stages Nos. 1, 2, and 3, it is shown in Fig. 3C how these three stages of the shift register may be used to control the conditions of two of the control relays of a bank of control relays.

Each of the relays controlled by the shift register is shown in Fig. 3C as being a magnetic stick type of relay. Energization of the upper winding causes the relay to pick up, while energization of the lower winding causes it to drop away. The magnetic stick characteristic causes each relay to remain in its last-actuated position until controlled to the opposite position.

Each storage tube of a shift register stage has its plate connected through a resistor to (B+). The plate of tube 360 of the shift register stage No. 0 has its plate connected in this way through resistor 435 to (B+). The plate of tube 368 is connected also through a resistor 436, through the upper winding of relay 2RGZ, and back contact 430 of relay 2LGZ, to the bus 437. Still another connection is provided from the plate of tube 368, through resistor 438, the upper winding of relay 1RGZ, and back contact 431 of relay 1LGZ, to bus 439. In a similar way, the upper windings of relays 1LGZ and 2LGZ are connected through respective resistors to the plate of tube 395 included in the shift register stage No. 3.

The plate of tube 384 which is the storage tube for shift register stage No. 2 is connected through resistor 440, and through the windings of relays 2LGZ and 2RGZ in parallel to bus 437. This plate of tube 384 is similarly connected through resistor 441 and the lower windings in series of relays 1LGZ and 1RGZ to bus 439.

If it is assumed that the three-position control lever at the control office is so positioned that a mark character is transmitted on the fifteenth pulse period so that space characters are transmitted on the fourteenth and thirteenth pulse period, then the shift register at the corresponding field station will have its stage Nos. 1 to 3 so conditioned that tube 368 will be conductive while tubes 384 and 385 will be nonconductive. If it is further assumed that it is the group A controls that have been received, then, according to the description already given with respect to the various system functions provided by station stepper 86, it will be clear that on the two station periods immediately following the reception of such group A controls, the group A control execution relay 121 will be picked up. When relay 121 picks up, it closes its front contact 442 so as to energize the bus 439. There is then a flow of current from (B+), through front contact 442, bus 439, back contact 431 of relay 1LGZ, the upper winding of relay 1RGZ, resistor 438, and through the plate-cathode circuit of the now conducting tube 368. This tube has its cathode connected over bus 115, and this bus is connected to the plate of tube 353 so that a path is provided from the plate of this tube 353 to ground so as to complete a circuit which includes the upper winding of relay 1RGZ. As a result of this energization, relay 1RGZ is picked up.

If the group A control code were so arranged that a mark character were received on the thirteenth instead of the fifteenth pulse period, tube 385 of stage No. 3 would be conductive; whereas, tubes 368 and 384 would then be nonconductive. Under these conditions, a circuit would be completed upon the picking up of relay 121, and this circuit would cause current to pass through the upper winding of relay 1LGZ so as to pick up this relay.

If the control code were so arranged that a mark were transmitted on the fourteenth pulse period and with spaces appearing on the thirteenth and fifteenth pulse periods so that tube 384 would be conductive, a circuit would then be completed upon the picking up of relay 121 to energize the lower windings of both relays 1RGZ and 1LGZ. Energization of these lower windings would then result in the dropping away of both of these relays.

In this way, three successive digits of the control code may be utilized for the control of two relays at a field station to anyone of three distinctive conditions. Thus, the transmission of a mark on the fifteenth pulse period causes the picking up of relay 1RGZ at a selected field station. The transmission of a mark on the thirteenth pulse period results in the picking up of relay 1LGZ at the same field station. Transmitting a mark on the fourteenth pulse period causes both relays 1RGZ and 1LGZ to be dropped away.

Following the reception of the group B controls at any field station, the group B control execution relay 131 is picked up. Energy is then applied to bus 437 so that the relays 2RGZ and 2LGZ then become responsive to the conditions of the first three shift register stages in exactly the same way as just described for relays 1RGZ and 1LGZ.

Any two shift register stages such as stages Nos. 14 and 15 may be used to control a single relay in either of the group A or group B banks of control relays. If a mark is transmitted on the first pulse period so that storage tube 445 of stage No. 15 becomes conductive, then the lower winding of either relay 1NWR or 2NWR is energized depending upon whether it is a group A or a group B control that is being executed. Similarly, the upper windings of these relays may be selectively energized if a mark is transmitted on the second pulse period so as to cause the tube 446 of stage No. 14 to become conductive. In this way, the transmission of a mark on the first pulse period of the group A code for a second station causes the relay 1NWR at that station to be dropped away. The transmission of a mark on the second pulse period of the group A control for that station results in the picking up of the relay 1NWR at that station.

*Carrier transmitter.*—The carrier transmitter 24 shown in Fig. 3D is modulated directly from the last stage of the shift register and is effective to cause the distinctive carrier frequency F2 to be selectively applied to the line wires in a particular code pattern of marks and spaces.

The carrier transmitter 24 also includes a pulsed Hartley oscillator comprising the tubes 443 and 444. Tube 443 is normally conductive because its control grid is connected through resistor 447 to (B+). With tube 443 conductive, the oscillator is inoperative so that carrier frequency F2 cannot be applied to the line wires 10.

The control grid of tube 443 is connected through a coupling capacitor 448 to the plate of the cold cathode intermediate tube 458 of shift register stage No. 15 shown in Fig. 3C. Normally tube 458 is in a nonconductive condition so that its plate voltage is at a relatively high level, and capacitor 448 is then charged to this high potential existing between the plate of tube 458 and the grid of tube 443 which is at approximately ground potential.

According to the description of the shift register that has already been given, the stepping of a control code into the shift register on selected station periods of a cycle is accompanied by the stepping out of an indication code through the last stage of the shift register. In effect, the last stage of the shift register is selectively controlled to its "0" or its "1" condition on successive pulse periods in accordance with the indication code previously stored in the shift register. For each space character of the indication code, tube 445 of stage No. 15 remains nonconductive. Therefore, when bus 115 is raised in potential, tube 458 remains nonconductive because there is then no change in the condition of tube 445.

On each pulse period that a mark character appears in the last stage of the shift register, tube 445 is fired. Then the raising of potential across bus 115 causes tube 445 to be extinguished and tube 458 is then fired. Each time that tube 458 is fired in this way for the occurrence of a mark character in the indication code, there occurs a decrease in plate potential of this tube throughout the corresponding pulse period. As a result, there is an abrupt decrease of voltage at the grid of tube 443, and this voltage decrease is of sufficient magnitude and duration to hold tube 443 nonconductive throughout that pulse period. As a result, the oscillator becomes operative, causing the plate current of tube 444 to vary sinusoidally at a frequency selected by the tank circuit in the cathode circuit of tube 445.

Tube 444 is provided with load resistors in both its plate and cathode circuits so that the required out-of-phase voltages may be provided to drive the push-pull power amplifier including tubes 449 and 450. The grid of tube 449, for example, receives an input voltage that is developed across the plate load resistor 451 of tube 444; whereas, the input grid voltage of tube 450 is obtained from the voltage drop appearing across the series resistors 452 and 453 appearing in the cathode circuit of tube 444.

The grids of tubes 449 and 450 are also connected through the respective resistors 454 and 455 to a tap on the potentiometer 456 which is connected between (B−) and ground. The tap on the potentiometer is adjusted to provide the desired bias for tubes 449 and 450, thereby providing a means for regulating the output level of this amplifier stage. The primary winding of a transformer 457 is included in the plate circuits of tubes 449 and 450, and a tap on this primary winding is connected directly to (B+). The alternating voltage induced in the secondary winding and having the frequency F2 is applied through the band-pass filter 25 to line wires 10.

The carrier transmitter 24 is thus normally inactive. As an indication code is stepped out of the shift register, the intermediate tube 458 of the last shift register stage becomes conductive for each mark character appearing in the indication code. Since only one-half of a pulse period elapses following the transfer of the code character to tube 458 before the potential on bus 116 is raised to extinguish this tube 458, the tube remains in its conductive stage only for one half of a pulse period. Since the carrier transmitter 24 is effective to supply the carrier frequency F2 to the line wires only throughout the time that tube 458 is conductive, it follows that the indication code includes mark characters which are similar to those appearing in the control code in that they comprise a pulse period in which carrier frequency is transmitted for the first half but with no carrier transmitted on the second half.

Having described an electronic shift register as one specific embodiment of this invention, I desire it to be understood that various other forms may be provided to illustrate the specific embodiment of this invention, and that various adaptations, alterations and modifications may be made, without in any manner departing from the spirit or scope of the present invention.

What I claim is:

1. An electronic shift register comprising, a plurality of stages each including an electron discharge storage tube and an electron discharge intermediate tube both capable of being alternatively controlled between conductive and nonconductive conditions, coupling circuit means governed by each storage tube for operating the associated intermediate tube from its normal state when said storage tube is restored to its normal state, circuit means governed by each intermediate tube for operating the storage tube of the following stage from its normal state when said intermediate tube is restored to its normal state, means for successively and alternately restoring first all said storage stages and then all said intermediate stages to their normal conditions, and means independent of said coupling circuit means for selectively operating each of said storage tubes from its normal condition in accordance with a particular preselected code pattern.

2. An electric shift register comprising, a plurality of stages each comprising a storage and an intermediate tube both being of the cold cathode grid glow tube, circuit means for applying distinctively time-spaced pulses occurring on preselected ones of a succession of pulse periods to the grid of said storage tube of said first stage to render said tube conductive, coupling circuit means for connecting the plate of said storage tube of each stage to the grid of the intermediate tube of the same stage and for also connecting the plate of each intermediate tube to the grid of the storage tube of the following stage, means effective on each of said pulse periods for alternately and successively raising the cathode potential of first said storage tubes and then said intermediate tubes to cause said tubes then in conductive conditions to be extinguished, whereby the extinguishing of a conductive storage tube causes the associated intermediate tube to be fired and the extinguishing of an intermediate tube causes the following storage tube to be fired to thereby cause the particular condition of each storage tube to be transferred to a following storage tube on successive pulse periods.

3. An electronic shift register comprising, a plurality of cascaded stages, each stage comprising both a storage tube and an intermediate tube of the cold cathode grid glow type, each storage tube having its cathode connected to a main shift bus and each intermediate tube having its cathode connected to an intermediate shift bus, each of said tubes having its plate connected through a load resistor to a source of positive voltage, coupling circuit means connecting the plate of each storage tube to the grid of the intermediate tube of the same stage and connecting the plate of each intermediate tube to the grid of the storage tube of the next stage, circuit means for alternately raising the voltage on said main and said intermediate shift buses on each of a succession of pulse periods to a level causing all said tubes connected to said bus to be extinguished, input circuit means for said shift register for making conductive the storage tube of the first stage on selected pulse periods, whereby the conductive state of any storage tube on a selected pulse period is transferred to the storage tube of the next stage on the following pulse period.

4. An electronic shift register comprising a plurality of stages each including a gas discharge storage tube and a gas discharge intermediate tube, circuit means for applying time-spaced pulses in a distinctive code pattern on selected ones of successively occurring pulse periods to said storage tube of the first stage to selectively render said tube conductive, coupling circuit means for connecting the plate of said storage tube of each stage to the grid of the intermediate tube of said same stage and for also connecting the plate of the intermediate tube of each stage to the grid of the storage tube of the next stage, a load resistor included in the plate circuit of each storage and each intermediate tube, means effective on each of said pulse periods to first momentarily raise the voltage on the cathode of each storage tube and then to momentarily raise the voltage on the cathode of each intermediate tube thereby causing said tubes then in conductive conditions to be extinguished, the extinguishing of any storage or intermediate tube resulting in a voltage rise at the plate of said tube being effective through the associated coupling circuit means to fire the gas discharge tube associated with said plate electrode, whereby on each successive pulse period the conductive condition of any storage tube is transferred first to its associated intermediate tube and then to the associated storage tube of the following stage of said shift register.

References Cited in the file of this patent

UNITED STATES PATENTS

| | | |
|---|---|---|
| 2,668,931 | Hall et al. | Feb. 9, 1954 |
| 2,678,409 | Holden | May 11, 1954 |
| 2,709,771 | Dehn | May 31, 1955 |
| 2,837,641 | Geisler | June 3, 1958 |
| 2,850,718 | Davidson et al. | Sept. 2, 1958 |